(12) United States Patent
Brown et al.

(10) Patent No.: US 10,802,881 B2
(45) Date of Patent: Oct. 13, 2020

(54) METHODS AND DEVICES FOR ENABLING DISTRIBUTED COMPUTERS TO COMMUNICATE MORE EFFECTIVELY IN AN ENTERPRISE REQUIRING FLEXIBLE APPROVAL NOTIFICATIONS

(71) Applicant: ADP, LLC, Roseland, NJ (US)

(72) Inventors: Michael F. Brown, New York, NY (US); Robert Tucker, New York, NY (US); Kuntal Roy, North Brunswick, NJ (US); Annelise Levitt, New York, NY (US); Edgardo Aviles Lopez, New York, NY (US); Kevin A. Miller, New York, NY (US); Lauren Miller, New York, NY (US); Lohit J. Sarma, New York, NY (US)

(73) Assignee: ADP, LLC, Roseland, NJ (US)

( * ) Notice: Subject to any disclaimer, the term of this patent is extended or adjusted under 35 U.S.C. 154(b) by 36 days.

(21) Appl. No.: 15/955,562

(22) Filed: Apr. 17, 2018

(65) Prior Publication Data

US 2019/0317819 A1 Oct. 17, 2019

(51) Int. Cl.
*G06F 9/50* (2006.01)
*G06F 9/54* (2006.01)
*G06F 9/48* (2006.01)
*G06F 16/901* (2019.01)

(52) U.S. Cl.
CPC .......... *G06F 9/5038* (2013.01); *G06F 9/4843* (2013.01); *G06F 9/542* (2013.01); *G06F 16/9024* (2019.01)

(58) Field of Classification Search
CPC ............... G06Q 10/00; G06Q 10/1097; G06Q 30/0637; G06F 16/9024; G06F 21/604
See application file for complete search history.

(56) References Cited

U.S. PATENT DOCUMENTS

| | | | |
|---|---|---|---|
| 7,117,165 B1 * | 10/2006 | Adams | G06Q 10/00 705/26.4 |
| 10,353,686 B1 * | 7/2019 | Pasha | H04L 67/34 |
| 2002/0161766 A1 * | 10/2002 | Lawson | G06F 21/6218 |
| 2008/0098484 A1 * | 4/2008 | Cicchitto | H04L 63/101 726/27 |

(Continued)

*Primary Examiner* — Dong U Kim
(74) *Attorney, Agent, or Firm* — Yee & Associates, P.C.

(57) ABSTRACT

A computer-implemented method of enabling distributed computers to communicate more effectively in an enterprise that provides flexible approval notifications in an organization, wherein at least one of the distributed computers stores a graph database in which attributes regarding individuals of the organization are stored. The computer-implemented method includes receiving, at a server computer in the distributed computers, a request for a task to be performed, wherein the task requires approval by at least a first person in the organization who has authority to approve the request. The computer-implemented method also includes traversing, by the server computer, the graph database, to determine an identity of the first person, wherein traversing is performed based on criteria determined at least partially by information automatically extracted from the request. The computer-implemented method also includes transmitting, automatically by the server computer, the request to a client computer to which the first person has access.

20 Claims, 27 Drawing Sheets

(56) References Cited

U.S. PATENT DOCUMENTS

| | | | |
|---|---|---|---|
| 2009/0320088 A1* | 12/2009 | Gill ...................... | G06F 21/604 |
| | | | 726/1 |
| 2012/0166323 A1* | 6/2012 | Guo ...................... | G06Q 30/04 |
| | | | 705/34 |
| 2016/0110412 A1* | 4/2016 | Sun ..................... | G06F 16/9577 |
| | | | 707/769 |
| 2018/0239959 A1* | 8/2018 | Bui ....................... | G06F 3/0484 |
| 2019/0057064 A1* | 2/2019 | Bonk .................. | G06F 16/9024 |
| 2019/0287106 A1* | 9/2019 | Sadeddin ............. | G06Q 20/401 |

* cited by examiner

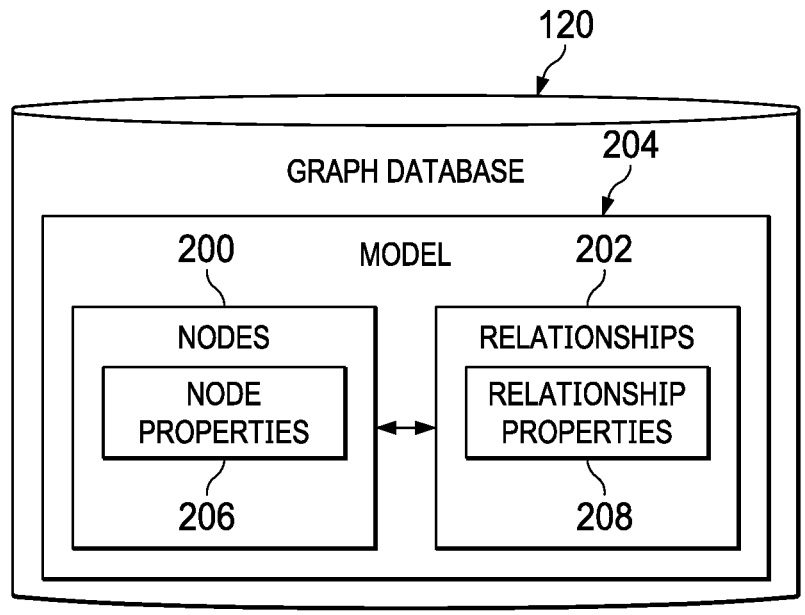
FIG. 2
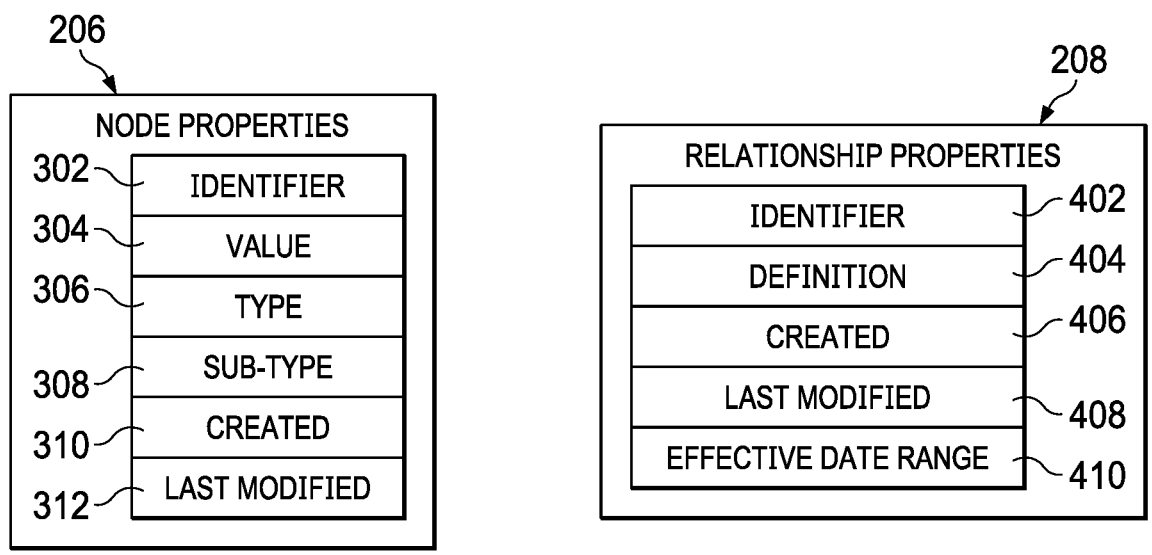
FIG. 3
FIG. 4

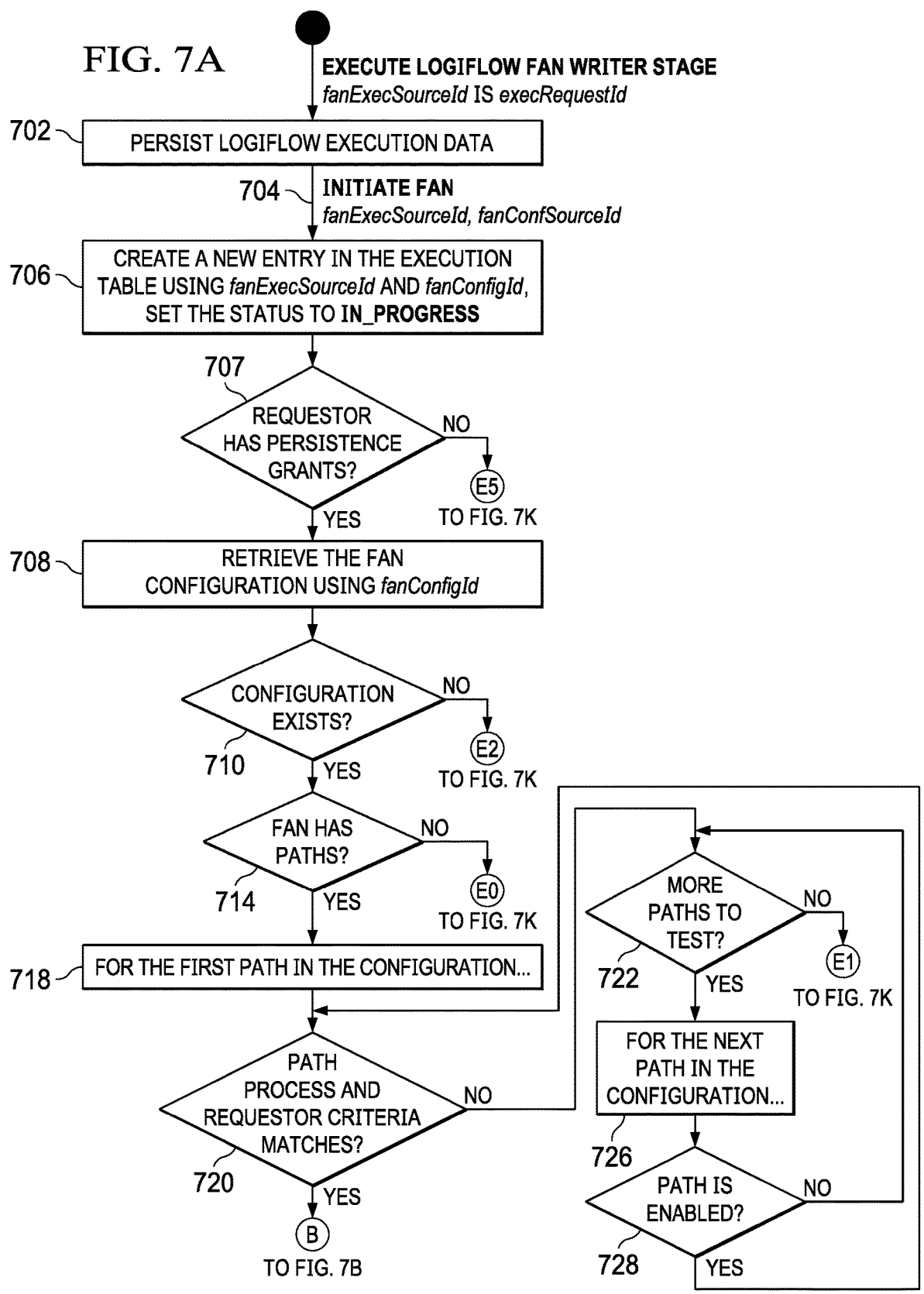

FIG. 8L

FROM FIG. 8H

FAN Auto Resolution Picklist
FanAutoResolutionPicklist
<<*Picklist*>>

| none (default0) | None |
|---|---|
| approve | Approve |
| reject | Reject |

FAN Approver Type Picklist
FanApproverTypePicklist
<<*Picklist*>>

| relationship | Relationship |
|---|---|
| role | Role |

FAN Source Type Picklist
FanSourceTypePicklist
<<*Picklist*>>

| logiflow (default) | Logiflow |
|---|---|

FAN Status Picklist
FanStatusPicklist
<<*Picklist*>>

| unset (default) | Unset |
|---|---|
| inProgress | In Progress |
| approved | Approved |
| rejected | Rejected |
| error | Error |
| canceled | Canceled |
| skipped | Skipped |
| requested | Requested |

FROM FIG. 8K

METHODS AND DEVICES FOR ENABLING DISTRIBUTED COMPUTERS TO COMMUNICATE MORE EFFECTIVELY IN AN ENTERPRISE REQUIRING FLEXIBLE APPROVAL NOTIFICATIONS

BACKGROUND INFORMATION

1. Related Applications

This application is related to U.S. application Ser. No. 15/429,154, filed Feb. 9, 2017, attorney docket number ES2014041-1-C; which is a continuation application of U.S. application Ser. No. 14/523,321 filed Oct. 24, 2014; which claims priority to provisional application 62/064,652, filed Oct. 16, 2014, and also to provisional application 62/064,672 filed Oct. 16, 2014. All of these documents are incorporated herein by reference.

2. Field

The present disclosure relates to methods and devices for enabling distributed computers to communicate more effectively in an enterprise requiring flexible approval notifications. More particularly, the illustrative embodiments are related to increasing the efficiency of communication among distributed computers in a network environment.

BACKGROUND

An "enterprise" is a plurality of physical computers that communicate with each other at least indirectly and which, as a whole, are configured to cooperate together to accomplish one or more tasks. An "enterprise environment" is all of the physical hardware that allows the enterprise to operate, including wired and wireless communications devices and other equipment such as but not limited to printer, scanners, input devices, monitors, and other hardware components.

When an enterprise environment becomes large and sophisticated, communication among computers can become problematic. This communication problem evidences itself when certain tasks are desired to be performed by an organization that maintains the enterprise environment.

For example, an organization may require approvals for certain business activities, such as but not limited to the expenditure of money. However, when the organization is large, knowing to which computer or address to send an approval request can be problematic. It cannot be assumed for large organizations that an employee knows the computer or electronic address for the proper person authorized to approve a monetary request. Additionally, it may be difficult to submit a request to find such a person. Accordingly, the overall efficiency and performance of both the enterprise itself and the organization operating the enterprise can be affected in an undesirable manner.

SUMMARY

The illustrative embodiments provide for a computer-implemented method of enabling distributed computers to communicate more effectively in an enterprise that provides flexible approval notifications in an organization, wherein at least one of the distributed computers stores a graph database in which attributes regarding individuals of the organization are stored. The computer-implemented method includes receiving, at a server computer in the distributed computers, a request for a task to be performed, wherein the task requires approval by at least a first person in the organization who has authority to approve the request. The computer-implemented method also includes traversing, by the server computer, the graph database, to determine an identity of the first person, wherein traversing is performed based on criteria determined at least partially by information automatically extracted from the request. The computer-implemented method also includes transmitting, automatically by the server computer, the request to a client computer to which the first person has access.

The illustrative embodiments also contemplate a non-transitory computer readable storage medium storing program code, which when executed by a processor, performs the above computer-implemented method. The illustrative embodiments also contemplate a computer including a processor and a non-transitory computer readable storage medium storing program code, which when executed by the processor, performs the above computer-implemented method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of a graph database in accordance with an illustrative embodiment;

FIG. 3 is an illustration of a block diagram of node properties in a graph database in accordance with an illustrative embodiment;

FIG. 4 is an illustration of a block diagram of relationship properties in a graph database in accordance with an illustrative embodiment;

FIG. 7A is part of a single flowchart of an improved computer communication process using flexible approval notification, in accordance with an illustrative embodiment;

FIG. 8L is part of a single data model that supports an improved computer communication process in an enterprise environment using flexible approval notification, in accordance with an illustrative embodiment;

DETAILED DESCRIPTION

Figure 1:
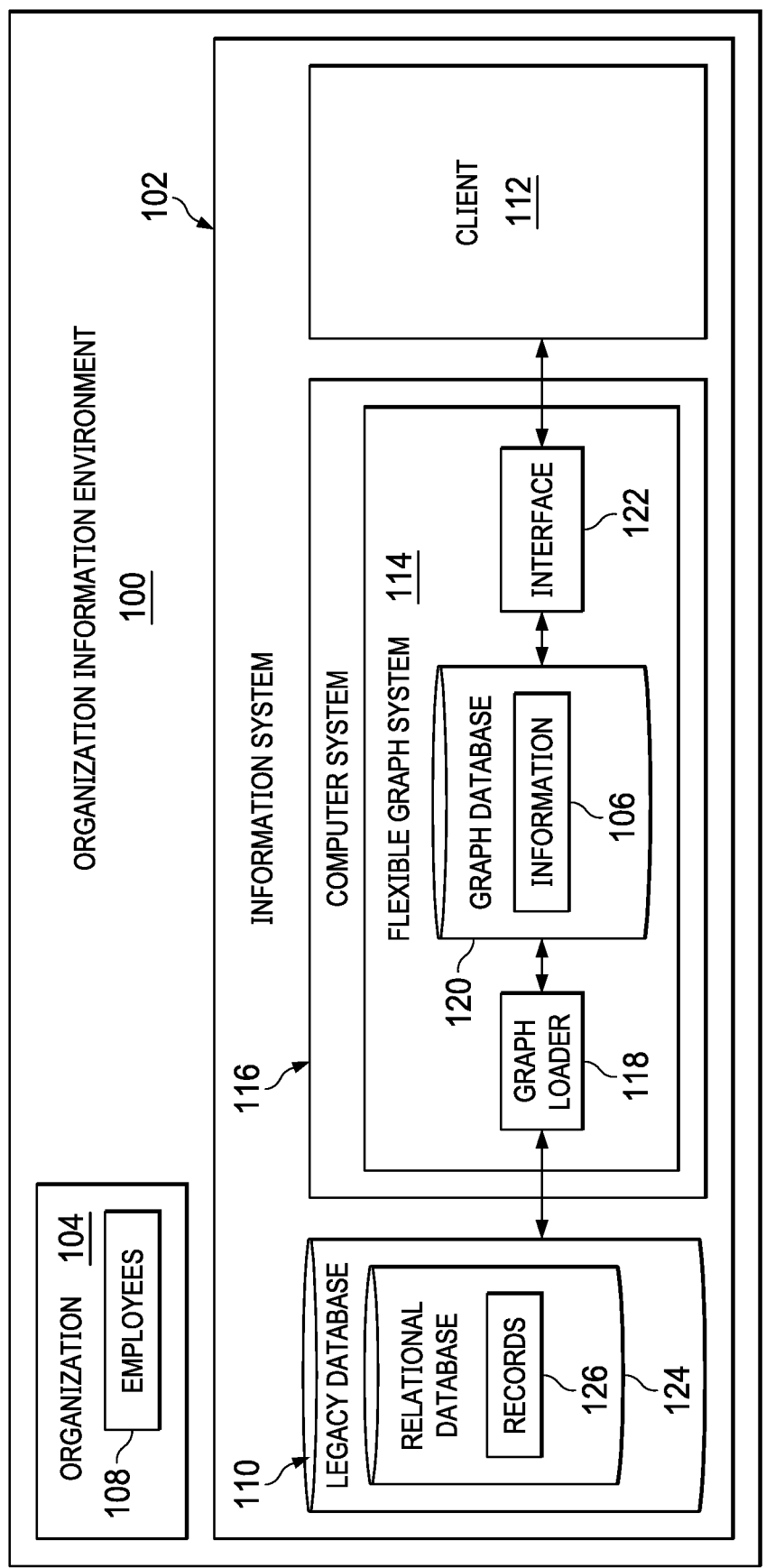
FIG. 1 is an illustration of a block diagram of an organization information environment in accordance with an illustrative embodiment.

The illustrative embodiments recognize and take into account that communication difficulties between computers can arise in large enterprise environments, particularly when the identity of the computer of receiver of a communication is not necessarily known. In the case of large organizations, where approvals may be required by more senior employees, the identity of the person who will approve an action may not be known. Thus, the illustrative embodiments provide for flexible approval notification (FAN) in an enterprise environment. The illustrative embodiments solve a computer-centric problem; namely, identifying the recipient of an approval request and the identity of the computer system or account associated with the recipient in an enterprise environment.

The illustrative embodiments solve this computer-centric problem in a technical manner. In particular, the illustrative embodiments take advantage of a graph database stored in the enterprise environment. The graph database stores information about the organization and the individuals in the organization as nodes and edges, using both elements and attributes. Fully flexed objects, as explained below, are brought into the graph. The illustrative embodiments may traverse the graph database to find a person in the organization who has the ability to approve a request. The traversals may be criteria based, with comparable criteria embedded in the attributes in the graph database. The person is identified based on rules, criteria, and/or metadata. In one illustrative embodiment, there is no inherent definition or role of someone who has the ability to approve a request. In this case, determining who is the approver is calculated only based on the inputs to the process and the rules configured by the client.

The illustrative embodiments also contemplate customization or configuration of criteria and rules which govern which user is the intended approver. The FAN system may use the concept of unique rules being defined by each individual client. Thus, one value of the FAN system is the ability to provide for such configuration while relying on the flex structures graph, described below, to perform complex and efficient traversals defined by the criteria and rules for a given client.

The illustrative embodiments may be metadata driven. For example, the rules or criteria may exist as metadata, thereby providing a more flexible technical approach to the technical information processing problem. Thus, the illustrative embodiments provide for the ability to bring complex objects and criteria based traversal of a graph database.

The illustrative embodiments not only use pure criteria, but also provide for entitlements between individuals in the organization. For example, a manager may be stored in the graph database has having an entitlement to effect certain changes in the organization. Thus, in traversing the graph database, the illustrative embodiments provide for linking the identity of a requestor to an identity of an appropriate manager.

In this arrangement, source data is not necessarily stored in the graph database, but may be. Instead, pointers in the graph database may point to source data in other storage devices, thereby keeping the size of the graph database manageable. The graph database may also be flexible enough to import data from other sources when needed to identify a person or a computer when a request for authorization is submitted. Additionally, a client or user can dynamically define the data or metadata which drives the flex graph.

The flexible approval notification (FAN) of the illustrative embodiments may be provided as a service by a third party to a client organization. Thus, the graph database need not be stored at or belong to the client organization.

In one illustrative embodiment, the FAN system may rely on flex graph. However, in another illustrative embodiment, the resolution of approvers could be calculated or queried via a traditional database if such conditions were required. Thus, there can be an abstraction which does riot require a flex graph.

In either case, the illustrative embodiments may be client configurable. By changing rules, criteria, and/or metadata, a user can configure how the graph database is traversed when receiving a request for an approval. In a similar manner a user can define the different approvers required and whether requests to approvers are sequential or parallel.

The illustrative embodiments may also provide for automatic approvals in some cases. For example, a user submits a request for approval for an action, which is directed to a system or a user input only (as opposed to directly to a manager). The system identifies the manager who, in some instances and for some actions, may set automatic approval for certain requests. The system identifies the manager, identifies that the requested action should be granted automatic approval, and returns an approval notification to the sender of the request. Thus, the speed and operation of the computer communication in the enterprise environment may be substantially increased.

In another example, the FAN system need not actually provide an approval on behalf of a manager, when automatic approval is setup. Instead, clients can create approval routes which are selected based on certain conditions of the request data and/or requester data, such as role, location, policies, etc. When an approval route with automatic approval or rejection is selected, the system approves and progresses the request, without ever finding a manager. Thus, again, the speed and operation of the computer communication in the enterprise environment may be substantially increased.

In some illustrative embodiments, such customization may be provided at run time, including approval routes and paths within the system of record. For example, the client configuration of FAN may dictate how the service traverses the graph database without necessarily storing this information within the graph database itself. The illustrative embodiments provide for determining, at runtime, which routes in the graph database traversal are valid for a particular request.

The illustrative embodiments may be based on a system of record (SOR) and a configuration using a client configuration control center. For each business process that has a FAN stage an at, the client has the ability to configure one or more routes which then impact the behavior when a user initiates that process. In this manner, the illustrative embodiments provide for traversing a hierarchy based on how the client wants the hierarchy configured. Additionally, the illustrative embodiments also provide for complex relationships based on the metadata of the organizations' associates. The FAN, itself, need not provide a mechanism for configuring the hierarchy. Rather, the FAN system may provide a way for clients to create rules that govern how the hierarchy is traversed to find approvers.

The following definitions apply throughout this document.

The term "FAN" (upper case) refers to "flexible approval notification" or "flexible approval notifications."

An "enterprise" is a plurality of physical computers that communicate with each other at least indirectly and which, as a whole, are configured to cooperate together to accomplish one or more tasks.

An "enterprise environment" is all of the physical hardware that allows the enterprise to operate, including wired and wireless communications devices and other equipment such as but not limited to printer, scanners, input devices, monitors, and other hardware components.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category. For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to the Figures, and in particular, with reference to FIG. 1, an illustration of a block diagram of an organization information environment as depicted in accordance with an illustrative embodiment. Organization information environment 100 includes information system 102 for organization 104. Organization 104 may take various forms. For example, organization 104 may be a company, a partnership, a government agency, a city, a charitable organization, or sonic other suitable type of organization. In particular, information system 102 may store information 106 about employees 108 in organization 104. Information system 102 may be an enterprise or an enterprise environment.

In this illustrative example, information system 102 includes a number of different components. As depicted, information system 102 includes legacy database 110, client 112, and flexible graph system 114.

Legacy database 110 is a database used by organization 104. In particular, legacy database 110 does not have a desired level of performance in this illustrative example. Legacy database 110 may be, for example, a relational database, an article database, or sonic other type of database.

Client 112 is a data processing system that may be used to access at least one of legacy database 110 or flexible graph system 114. In particular, client 112 may be used to access information 106 in at least one of legacy database 110 or flexible graph system 114. In these illustrative examples, the access may be at least one of reading, writing, modifying, or otherwise accessing information 106.

Flexible graph system 114 provides a desired level of performance to access information 106 as compared to legacy database 110. In particular, flexible graph system 114 may be implemented in computer system 116. Computer system 116 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, an electronic flight bag, a mobile phone, or some other suitable data processing system.

In this illustrative example, flexible graph system 114 includes a number of different components. As depicted, flexible graph system 114 includes graph loader 118, graph database 120, and interface 122.

Graph loader 118 receives information 106 for legacy database 110. In this illustrative example, legacy database 110 takes the form of relational database 124. Information 106 is received in a form of records 126 used by relational database 124. Graph loader 118 converts records 126 into a form that is stored in graph database 120.

In the illustrative example, a record in records 126 is a data structure that stores a portion of information 106. In the illustrative example, a record may be a table, an entry with fields, a flat file, or some other suitable format. When legacy database 110 is relational database 124, records 126 may be tables.

Graph database 120 is a database that uses graph structures that have nodes and relationships. These relationships may be edges. Graph database 120 provides index free adjacency. In particular, each element in graph database 120 has a direct pointer to adjacent elements. An index for lookups is unnecessary with graph database 120.

In this illustrative example, graph database 120 is a database based on graph theory. The nodes and relationships stored in graph database 120 are described by a model. These nodes and relationships represent information 106. For example, the nodes in graph database 120 may be nouns in information 106 and the relationships in graph database 120 may be verbs in information 106. In this example, the verbs describe relationships between the nouns in information 106. Traversal between the nodes using the relationships is very efficient in graph databases, such as graph database 120.

Relational database 124 uses tables with rows as records 126 and columns as properties. These properties may store portions of information 106. The properties may also point a record in records 126 to another record in records 126 using information that identifies the other record. To traverse from one record to another using a property in a column of a record, requires an expensive join operation be performed on relational database 124. Relational databases, such as relational database 124, store data in an efficient manner. However, because of the requirement to perform these loin operations, retrieval of information from relational database 124 that is graphical in nature is less efficient as compared to graph database 120.

Interface 122 provides access to graph database 120. In this illustrative example, access may be provided to client 112. In response to requests received from client 112, interface 122 generates queries to obtain results from graph database 120. Interface 122 returns these results to client 112.

In the illustrative example, graph loader 118 and interface 122 may be implemented in software, hardware, firmware or a combination thereof. When software is used, the operations performed by graph loader 118 and interface 122 may be implemented in program code configured to run on hardware, such as a processor unit. When firmware is used, the operations performed by graph loader 118 and interface 122 may be implemented in program code and data and stored in persistent memory to run on a processor unit. When hardware is employed, the hardware may include circuits that operate to perform the operations in graph loader 118 and interface 122.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, organization 104 may continue to use legacy database 110. For example, client 112 may be used to make changes to legacy database 110. These changes may be sent to graph loader 118. In turn, graph loader 118 makes changes to graph database 120. As a result, graph database 120 may be synchronized with relational database 124.

In this manner, at least one of the performance or visualization provided using graph database 120 may occur using client 112 to access graph database 120. This type of access may occur while allowing organization 104 to continue using legacy database 110 to make changes to information 106.

For example, employees 108 may continue to use software and other applications designed for legacy database 110 to make changes to information 106. As a result, fewer updates to software and hardware may be made. Further, training and time needed to adjust to new software and hardware for making changes to information 106 directly in graph database 120 may be reduced.

As a result, computer system 116 operates as a special purpose computer system which enables faster access to information 106 about organization 104, as compared to currently used database systems. For example, at least one of interface 122 or graph loader 118 may be used to transport computer system 116 into a special purpose computer. In particular, at least one of graph loader 118 or interface 122 transforms computer system 116 into a special purpose computer system as compared to currently available general computer systems that do not have at least one of graph loader 118 or interface 122.

For example, graph loader 118 may enable the organization of graph database 120 and legacy database 110 in a manner that increases the speed at which information 106 may be accessed by client 112. In particular, interface 122 may allow for synchronization of legacy database 110 and graph database 120 that is substantially in real time. As a result, the manner in which information 106 in legacy database 110 is transformed into a form for use in graph database 120 may occur in a manner that allows for users to view information 106 in graph database 120 that is more accurate than is currently possible when updates to graph database 120 are performed over longer periods of time.

As another example, interface 122 also may decrease the processing resources needed by client 112. As a result, visualization of information 106 may be performed by client 112 that takes various forms that may have different amounts of processing resources. For example, client 112 may be a workstation, a tablet computer, a mobile phone, or some other suitable type of data processing system. With the use of interface 122, processing resources are reduced such that a desired level of performance occurs in data processing systems that have lower levels of processing resources as compared to desktop computers for workstations.

Next, with reference to FIG. 2, an illustration of a block diagram of a graph database is depicted in accordance with an illustrative embodiment. In this illustration, an example of components in graph database 120 is depicted. In the illustrative examples, the same reference numeral may be used in more than one Figure. This reuse of a reference numeral in different Figures represents the same element in the different Figures.

Graph database 120 includes nodes 200 and relationships 202. Nodes 200 and relationships 202 form model 204 for organization 104 in FIG. 1. Nodes 200 may represent various entities. For example, nodes 200 may represent at least one of a person, a position, and organization 104.

As depicted, relationships 202 indicate connections between nodes 200. In particular, relationships 202 indicate the relationship between nodes 200.

In this illustrative example, nodes 200 have node properties 206. Additionally, relationships 202 have relationship properties 208.

As depicted, node properties 206 for nodes 200 are portions of information 106 in FIG. 1 for the various entities. As used herein, a property for an item is at least one of an attribute, a value, a reference, or suitable types of properties for the item. For example, a property for a node may be at least one of an attribute of the node, a value for the node, or a reference pointing to the node.

In the illustrated example, relationship properties 208 for relationships 202 define relationships 202 between nodes 200 in model 204 for organization 104 in FIG. 1. For example, a property for a relationship may be at least one of an attribute of the relationship, a definition of the relationship, or a reference pointing to the relationship.

Turning next to FIG. 3, an illustration of a block diagram of node properties in a graph database is depicted in accordance with an illustrative embodiment. In this illustrative example, an example of node properties 206 is shown. As depicted, node properties 206 are an example of properties that may be used for nodes 200 in FIG. 2 in model 204 of organization 104 in FIG. 1.

In this illustrative example, node properties 206 include identifier 302, value 304, type 306, sub-type 308, created 310, and last modified 312. In the illustrated example, identifier 302 in node properties 206 for a node in nodes 200 in FIG. 2 is a reference pointing to the node. For example, the node may be found in a graph database using identifier 302.

As depicted, value 304 is the content of a node. Value 304 is at least one of a name, a number, data, or any other suitable type of value for the content of the node. For example, value 304 may be the name of a person represented by the node. As another example, value 304 may be employment data about an employee in employees 108 in organization 104 in FIG. 1.

In the illustrated example, type 306 is an identifier that describes what value 304 represents. Type 306 is at least one of identity, person, position, or organization. Type 306 may have sub-types.

As depicted, sub-type 308 is an identifier that describes what value 304 represents within type 306. For example, sub-type 308 for the organization type may be at least one of company, division, department, group, or other suitable sub-type for the organization type. As another example, sub-type 308 for the identify type is at least one of employee identifier, department identifier, client identifier, or other suitable sub-type of the identity type.

In this illustrative example, created 310 is a date and time that node properties 206 were created. Last modified 312 is a date and time that node properties 206 were last changed, in this illustrative example.

Next in FIG. 4, an illustration of a block diagram of relationship properties in a graph database is depicted in accordance with an illustrative embodiment. In this illustrative example, an example of relationship properties 208 is shown. As depicted, relationship properties 208 are examples of properties that may be used in relationships 202 in FIG. 2 in model 204 of organization 104 in FIG. 1.

In this illustrative example, relationship properties 208 include identifier 402, definition 404, created 406, last modified 408, and effective date range 410. In the illustrative example, identifier 402 in relationship properties 208 for a relationship is a reference to the relationship. For example, the relationship may be found in a graph database using identifier 402.

As depicted, definition 404 is a specification of a relationship for a node. In this illustrative example, definition 404 for the relationship of the node is at least one of a relationship between the node and at least one of the node, or another node. In this illustrative example, definition 404 of relationships is at least one of identifies, occupied by, belongs to, part of, manages, in charge of, or other suitable types of relationships for entities of organizations.

For example, definition 404 may be a specification of an occupied relationship between a node representing a position in model 204 in FIG. 2 and a node representing a person in model 204. In other words, in this example, definition 404 specifies that the position is occupied by the person.

As another example, definition 404 may specify a manages or in charge of relationship between a node representing a first position in model 204 in FIG. 2 and a node representing a second position in model 204. In other words, in this example, definition 404 specifies that the first position manages or is in charge of the second position.

In this illustrative example, created 406 is a date and time that relationship properties 208 were created. Last modified 408 is a date and time that relationship properties 208 were last changed, in this illustrative example.

Effective date range 410 identifies when the relationship is in effect. In this illustrative example, effective date range 410 includes at least one of a group of start dates indicating when the relationship is in effect, a group of end dates identifying when the relationship is not in effect, or other suitable types of information for identifying times when a relationship is or is riot in effect. As used herein, "a group of" when used with reference to items, means one or more items. For example, a group of dates is one or more dates.

Figure 5:
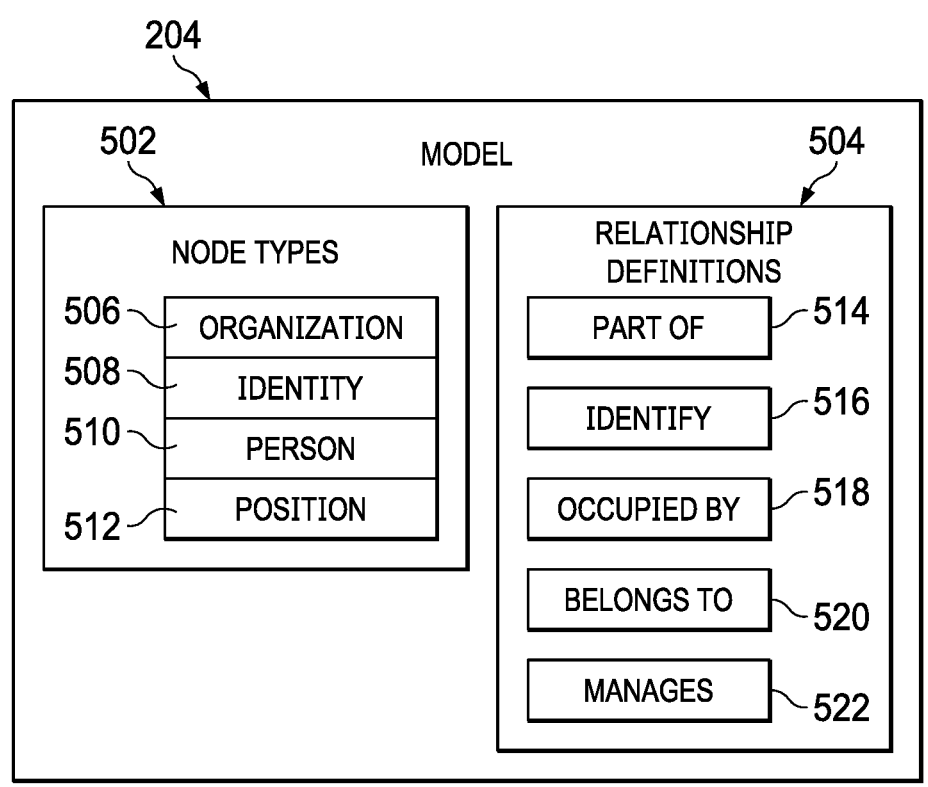
FIG. 5 is an illustration of a block diagram of a model for an organizational graph database in accordance with an illustrative embodiment.

Turning next to FIG. 5, an illustration of a block diagram of a model for an organizational graph database is depicted in accordance with an illustrative embodiment. In this illustrative example, an example of components that may be used in model 204 is shown.

As depicted, node types 502 are an example of types of nodes 200 in FIG. 2. As also depicted, relationship definitions 504 are examples of definitions of relationships 202 in FIG. 2 for nodes 200 for model 204 of organization 104 in FIG. 1.

In this illustrative example, node types 502 include organization 506, identity 508, person 510, and position 512. In this illustrative example, organization 506 is at least one of a parent company, a group of two or more companies, a group of two or more divisions within a company, a company, a division of a company, a department, in a company, a group of people, or other suitable portions of organization 104 in FIG. 1.

As depicted, person 510 is at least one of an employee in employees 108 in FIG. 1, a contractor, a temporary hire, a customer of organization, a relative of an employee, a lawyer retained by organization 104 in FIG. 1, or other suitable types of persons that may be added to model 204 for organization 104. In this illustrative example, position 512 is at least one of a job or task performed by a person. For example, position 512 may be a task for managing an employee. As another example, position 512 may be a task for leading an employee in performing another task. In this illustrative example, identity 508 is at least one of an employee identifier, a department identifier, a client identifier, or other suitable type of identifier within an organization.

In this illustrative example, relationship definitions 504 include part of 514, identify 516, occupied by 518, belongs to 520, and manages 522. As depicted, part of 514 specifies that a node is a part of another node. In particular, part of 514 is a type of relationship definition that specifies a node in nodes 200 in FIG. 2 is a part of another node in nodes 200.

As depicted, identify 516 specifies that one node identifies another node. In particular, identify 516 is a type of relationship definition that specifies a node in nodes 200 in FIG. 2 identifies another node in nodes 200. For example, an identity node may identify an organization.

In the illustrative example, occupied by 518 specifies that one node is occupied by another node. In particular, occupied by 518 is a type of relationship definition that specifies a node in nodes 200 in FIG. 2 is occupied by another node in nodes 200. For example, a manager position may be occupied by an employee.

In this illustrated example, belongs to 520 specifies that one node belongs to another node. In particular, belongs to 520 is a type of relationship definition that specifies a node in nodes 200 in FIG. 2 belongs to another node in nodes 200. For example, a position may belong to an organization.

As depicted, manages 522 specifies that one node manages another node. In particular, manages 522 is a type of relationship definition that specifies a node in nodes 200 in FIG. 2 manages another node in nodes 200. For example, at least one of a person or position may manage at least one of an organization, a person, or a position.

Figure 6:
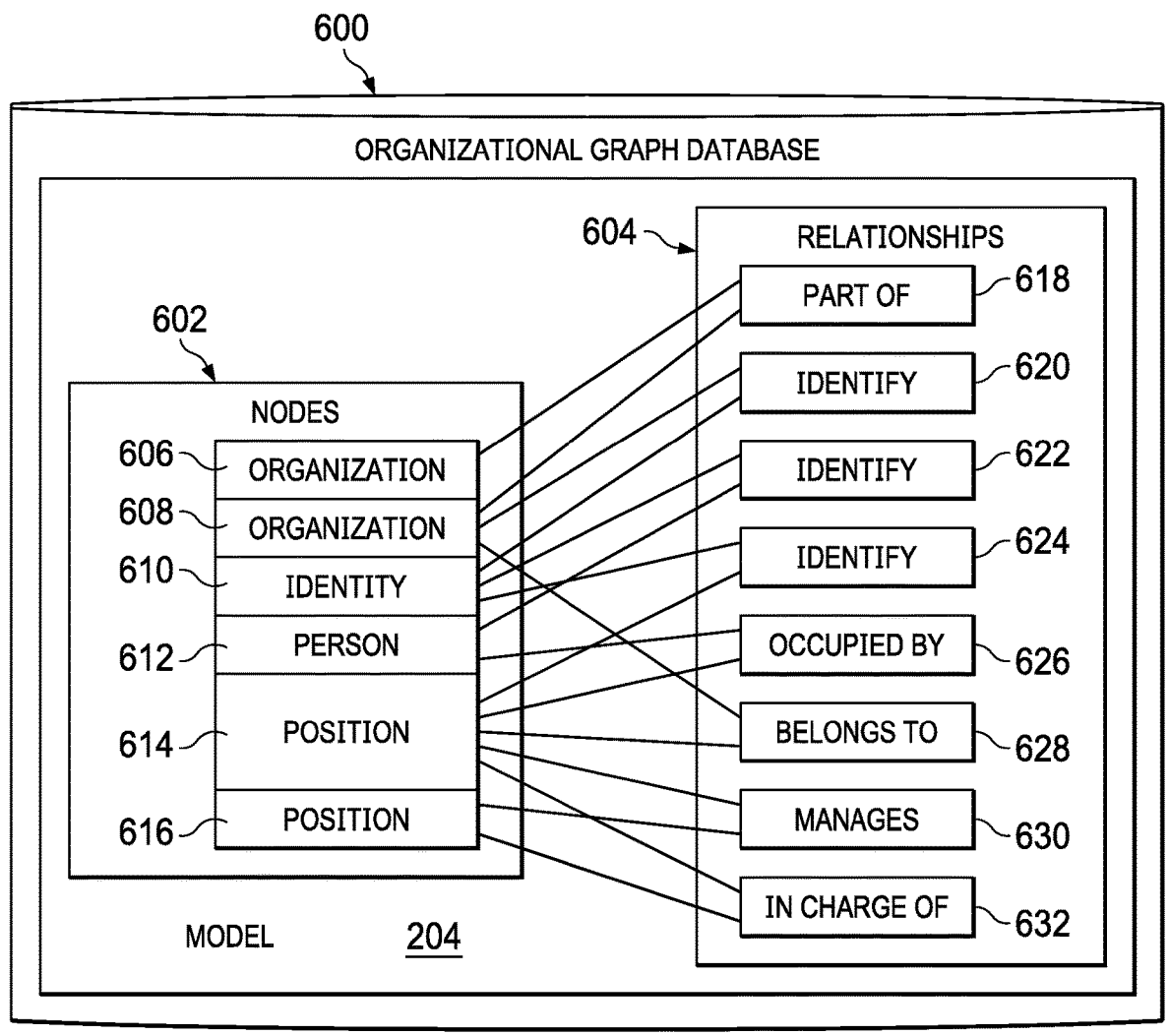
FIG. 6 is an illustration of a block diagram of a model for an organizational graph database in accordance with an illustrative embodiment.

With reference next to FIG. 6, an illustration of a block diagram of a model for an organizational graph database is depicted in accordance with an illustrative embodiment. In this illustrative example, one manner in which model 204 in FIG. 2 may be implemented is shown in FIG. 6.

As depicted, organizational graph database 600 is an example of an implementation for graph database 120 shown in FIG. 1 and FIG. 2. In this illustrative example, organizational graph database 600 shows an example of nodes 602 and relationships 604 in organizational graph database 600. As depicted, nodes 602 and relationships 604 form an example of nodes 200 and relationships 202 for model 204 in FIG. 2.

In the illustrative example, nodes 602 include organization 606, organization 608, identity 610, person 612, position 614, and position 616. In this illustrative example, organization 606 is organization 104 in FIG. 1. Organization 608 is at least one of company in organization 606, a division in organization 606, a department in organization 606, a group in organization 606, or other suitable portion of an organization.

As depicted, person 612 is an employee in employees 108 in FIG. 1. In this illustrative example, position 614 in organization 608 is occupied by person 612. As depicted, position 616 at least one of manages position 614 or is in charge of position 614. In this illustrative example, identity 610 is at least one of an employee identifier, a department identifier, a client identifier, or other suitable type of identifier within an organization.

In this illustrative example, relationships 604 include part of 618, identify 620, identify 622, identify 624, occupied by 626, belongs to 628, manages 630, and in charge of 632. As depicted, part of 618 specifies that organization 606 is part of organization 608. In this illustrative example, identify 620 specifies that identity 610 identifies organization 608. Identify 622 specifies that identity 610 identifies person 612. Identify 624 specifies that identity 610 identifies position 614.

As depicted, occupied by 626 specifies that person 612 occupies position 614. As also depicted, belongs to 628 specifies that position 614 belongs to organization 608.

In this illustrative example, manages 630 specifies that position 616 manages position 614. In charge of 632 specifies that position 616 is in charge of position 614.

FIG. 7A through FIG. 7K should be read together as a whole. Each of FIG. 7A through 7K is part of a single flowchart of an improved computer communication process using flexible approval notification, in accordance with an illustrative embodiment.

Figure 10:
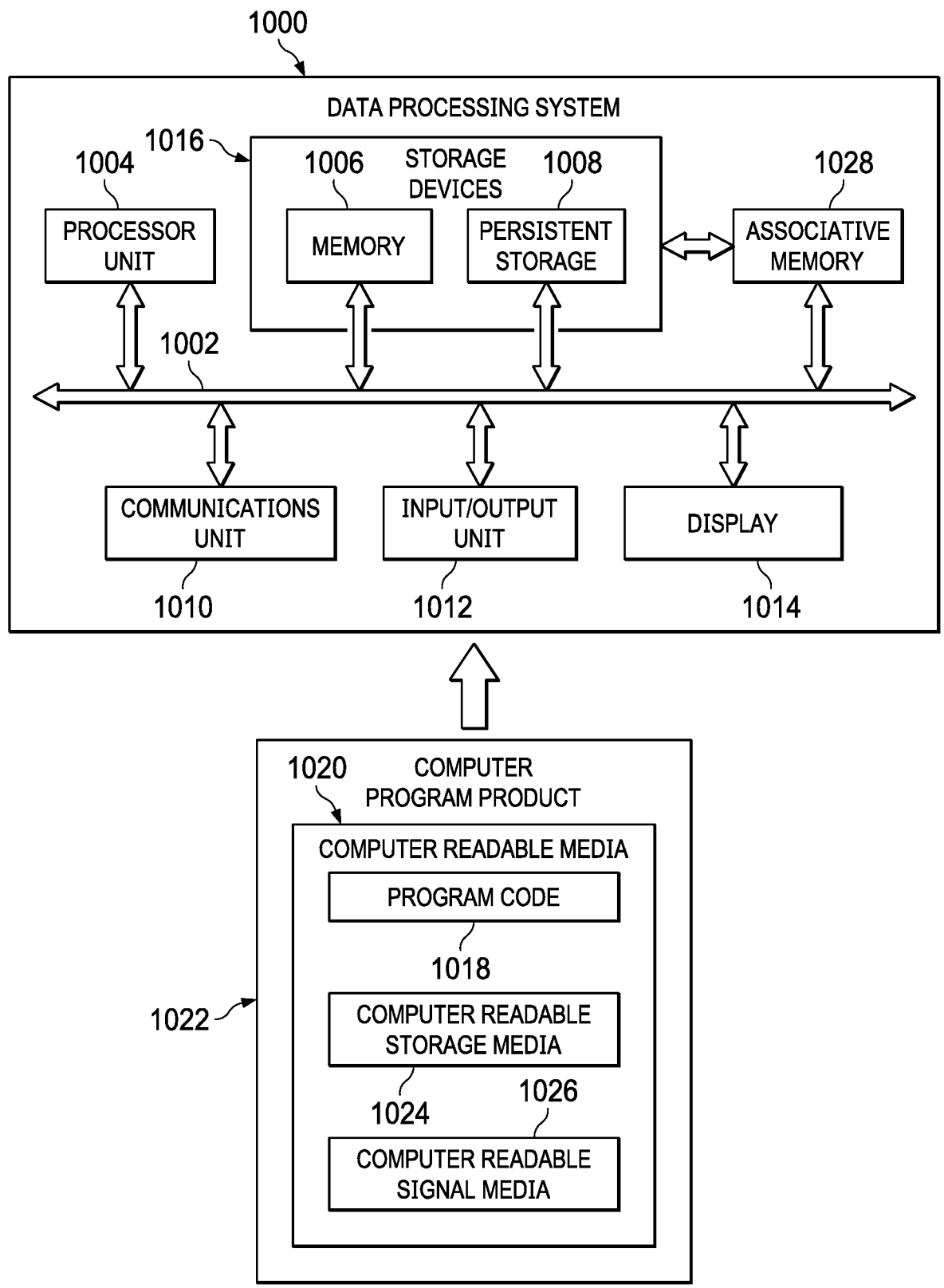
FIG. 10 illustrates a data processing system, in accordance with an illustrative embodiment.

Method 700 may be implemented using one or more data processing systems, such as data processing system 1000 of FIG. 10 using a data model such as data model 800 of FIG. 8A through FIG. 8I, in an enterprise environment. More particularly, method 700 may be implemented using a server computer in an enterprise environment. Method 700 is an example and thus does not necessarily limit alternative embodiments described elsewhere herein. Again, the term "FAN" means "flexible approval notification".

As a general summary, method 700 is initiated by a user invoking a Logiflow or some other triggering service. The Logiflow has the necessary data and information to execute the business process. At some point in the Logiflow a FAN stage can be configured to execute. When the Logiflow reaches this stage for execution it will send a request to the FAN system that it should trigger or initiate a FAN request. Thereafter, the first step is storing some Logiflow execution data (see operation 702) which is used in the FAN process.

Method 700 may begin by persisting logiflow execution data (operation 702), which is used in the FAN process. Method 700 then includes initiating fan (operation 704). In particular, the processor creates a new entry in the execution table using a "fanExecSourceID" and a "fanConfigID", setting the status of the process to "IN_PROGRESS" (operation 706). The processor then determines if the requestor has persistence grants (operation 707). If "no", method 700 moves to circle E5 and proceeds to operation 755. If "yes", then method 700 proceeds to retrieve the FAN configuration using the fanConfigID (operation 708). The FAN configuration is an identifier of the configuration of that FAN for that client.

A determination is then made whether the configuration exists (operation 710). If not, then the process skips to marking the status of the FAN record as ERROR "FAN has no configuration" at circle E2 (operation 712). In an illustrative embodiment, the user may define a default behavior for the route defined on the stage if there is no configuration. The processor then emits a "resolved" FAN event (operation 717) to the enterprise or to the enterprise environment. In one illustrative embodiment, the method may terminate thereafter. However, in another illustrative embodiment, the FAN stage then resumes Logiflow execution according to its default metadata settings, which can be "approve", "reject", or "error". This action is reflected in FIG. 8, namely, the "fanStage table, defaultResolution" property.

However, if the configuration does exist at operation 710, then the processor determines whether the FAN operation has any paths (operation 714). If not, then the process skips to marking the status of the FAN record as "ERROR "FAN has no paths" at circle E0 (operation 716). The processor then emits a "resolved" FAN event (operation 717) to the enterprise or to the enterprise environment. In one illustrative embodiment, the method may terminate thereafter. In another illustrative embodiment, instead, the Logiflow containing the FAN will not terminate, instead it will follow the default resolution defined in the configuration. This configuration is stored in the "defautResolution" property of the fanConfguration table, seen in FIG. 8.

However, if the FAN has paths, then the processor for the first path in the configuration (operation 718) determines whether the path process and requestor criteria matches (operation 720). If not, then the processor determines whether more paths are to be tested (operation 722). If more paths are not to be tested at operation 722, then the process skips to marking the status of the FAN record as "ERROR 'FAN has no matching paths'" (operation 724). The processor then emits a "resolved" FAN event (operation 717) to the enterprise or to the enterprise environment. In one illustrative embodiment, the method may terminate thereafter.

If more paths are to be tested at operation 722, then for the next path in the configuration (operation 726), the processor determines whether the path is enabled (operation 728). If the process is not enabled, then the process returns to the determination at operation 722. If the process is enabled, then the processor returns to the determination at operation 720. From operation 720, if the path process and requestor criteria matches, then the processor sets the "currentPathID in the execution" (operation 730). The processor then emits a "started FAN event" broadcast to the enterprise or to the enterprise environment (operation 732). At that point, as indicated at circle B in FIG. 7, method 700 proceeds to the next FAN step execution for fanExecID.

In particular, the processor retrieves the FAN execution data with fanExecID (operation 734). The processor then determines whether an auto-approval path exists (operation 736) in which automatic approval of the request will take place. If no such path exists, then the processor determines whether an auto reject path exists (operation 738) in which automatic rejection of the request will take place.

If the auto-approval path exists (operation 736), then the processor sets the FAN status as "APPROVED" (operation 740). In contrast, if the auto reject path exists (operation 738), then the processor sets the FAN status as "REJECTED" (operation 742). In both of these two cases, method 700 skips to the processor determining whether the FAN was approved (operation 744).

Returning top operations 736 and 738, if both of these determinations are negative, then the processor finds the next step based on the order and in the execution status (operation 746) as defined in the configuration. The processor then determines whether the next step is available (operation 748). If the next step is available, then the processor determines whether the step has approvers (operation 750). If the step does not have approvers, then the processor marks the status of the step as "SKIPPED" (operation 752) and method 700 returns to operation 746. Alternatively, at a "yes" determination at operation 750, the processor creates an entry for the step status and marks it as "IN_PROGRESS" (operation 762), and method 700 proceeds to operation 764.

Returning to operation 748, if the next step is not available, then the processor determines whether the step is empty (operation 754). If the step is empty, then method 700 skips to marking the status of the FAN record as ERROR "FAN has no approving steps" (operation 756). The processor then emits a "resolved" FAN event (operation 717) to the enterprise or to the enterprise environment. In one illustrative embodiment, the method may terminate thereafter.

However, if the steps are not empty at operation 754, then the processor determines whether all steps are approved (operation 758). If all steps are approved, then the processor sets the status of the FAN as "APPROVED" (operation 760). Thereafter, or if not all steps are approved (operation 758), then method 700 returns to operation 744 in which a determination is made whether a given FAN was approved.

Returning to operation 750, if the processor determines that the step has approvers, then the processor creates an entry for the step status and marks it as "IN PROGRESS" (operation 762). The processor then, for each of the approvers in the step (operation 764) will resolve the approver, the approve message, and send the approval request (operation 766). This process of resolving the approver uses the client configuration to traverse the flex graph.

The processor then determines if the approver has associates (operation 767). If "yes", then the processor then emits the "approval request sent" as a FAN event (operation 768) to the enterprise or to the enterprise environment. If "no", then the processor determines whether there is an escalation approver (operation 769). If "yes" at operation 769, then the process returns to circle H, see below, before returning to operation 766. If "no" at operation 769, then the process returns to operation 752 at which the status of the operation is marked as skipped.

At circle H (see operation 702D), for FAN approver escalation (approvalStatusID, fanExecID), the processor determines if the parameters are valid (operation 702D). If they are, then the processor retrieves an execution configuration and requestor context (operation 704D), and process returns to (operation 702E). If they are not, then the processor returns a "bad request" error (operation 706D), and method 700 may terminate thereafter.

After retrieving execution configuration and requestor context (operation 704D) the processor begins a process to handle approver escalation (operation 702E). The processor resolves the original approvers and their escalation approver (operation 702E). The processor then determines whether the approvers are valid (operation 704E). If not then the processor throws an error (operation 706E), with the process moving to circle E6 (operation 757), which is to mark the status of the FAN record as "ERROR 'FAN Approvers Resolved to Empty'". If yes, then the processor sends approval requests (operation 708E). The processor then emits an 'approver escalated' event (operation 710E). The processor then updates the FAN Exec and archives source approver action records (operation 712E). The process then continues back to circle H (operation 766).

Returning to operation 768, the processor then persists the "requestEventID in the execution status" (operation 770) and creates an entry for the step approval status and mark it as "REQUESTED" (operation 772).

The processor then determines whether all approval requests have been sent (operation 774). If not, then the process returns to operation 764. Otherwise, the processor determines whether there are enough approvers for a quorum (operation 775). If not, then method 700 continues to circle E4 and the processor marks the status of the FAN record as "ERROR 'FAN step has insufficient approvers'" (operation 753). Otherwise, the request process terminates, and the process waits for a response, so that the overall process can begin at operation 702.

Returning to operation 744, if the FAN eras approved, then the processor emits the "approved" FAN event (operation 776) to the enterprise or to the enterprise environment. The processor also emits the "resolved" FAN event (operation 778) to the enterprise or to the enterprise environment. In one illustrative embodiment, the method may terminate thereafter.

Returning to operation 744, if the FAN was not approved, then the processor determines whether the FAN was rejected (operation 780). The processor then emits the "rejected" FAN event (operation 782) to the enterprise or to the enterprise environment. Method 700 then proceeds to operation 778 and thereafter may terminate.

Returning to operation 780, if the FAN was not rejected, then the processor determines whether the FAN was canceled (operation 784). If the FAN was canceled, then the processor emits the "canceled" FAN event (operation 786) to the enterprise or to the enterprise environment. Method 700 then proceeds to operation 778 and thereafter may terminate.

Figure 7B:
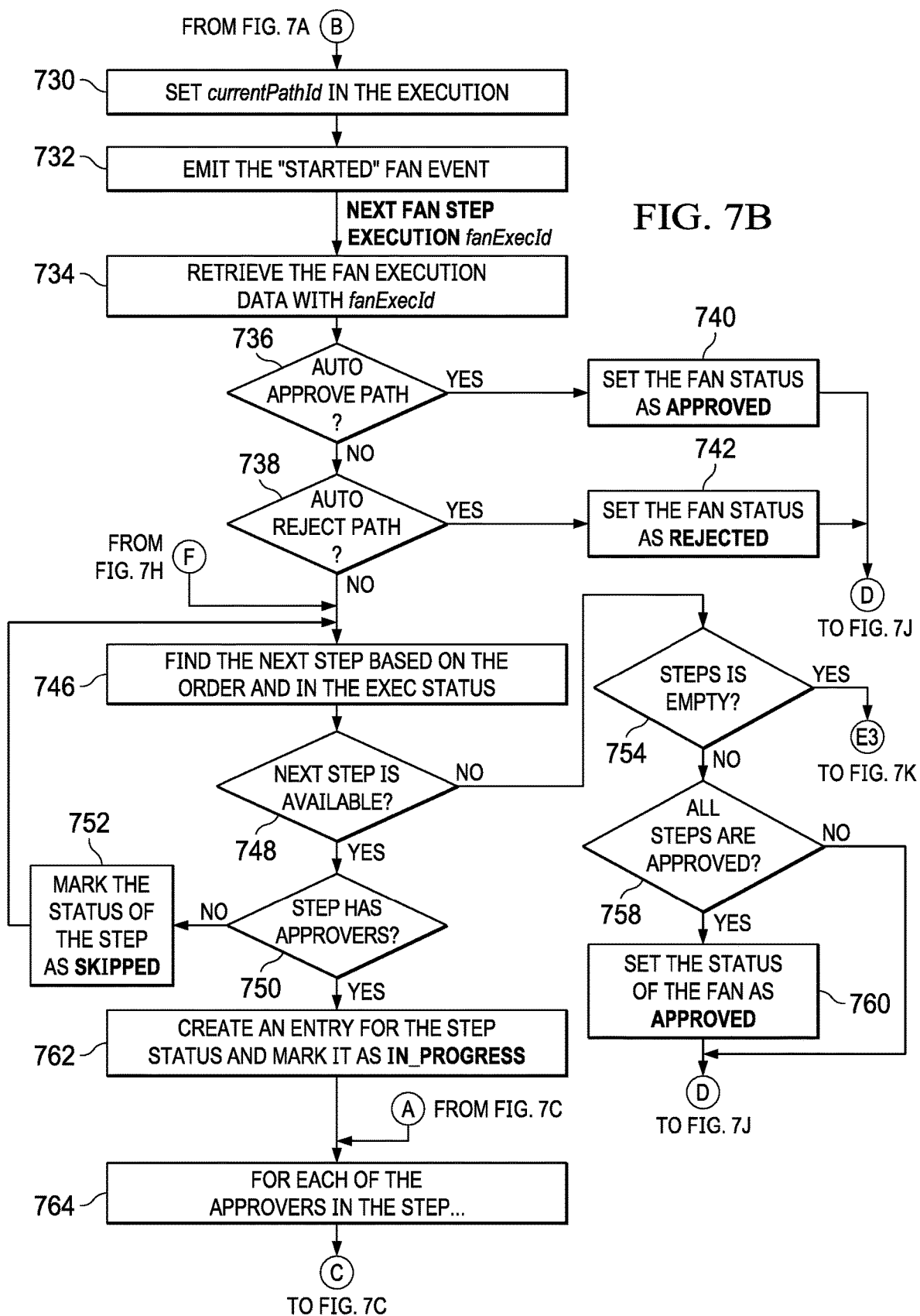
FIG. 7B is part of a single flowchart of an improved computer communication process using flexible approval notification, in accordance with an illustrative embodiment.
Figure 7C:
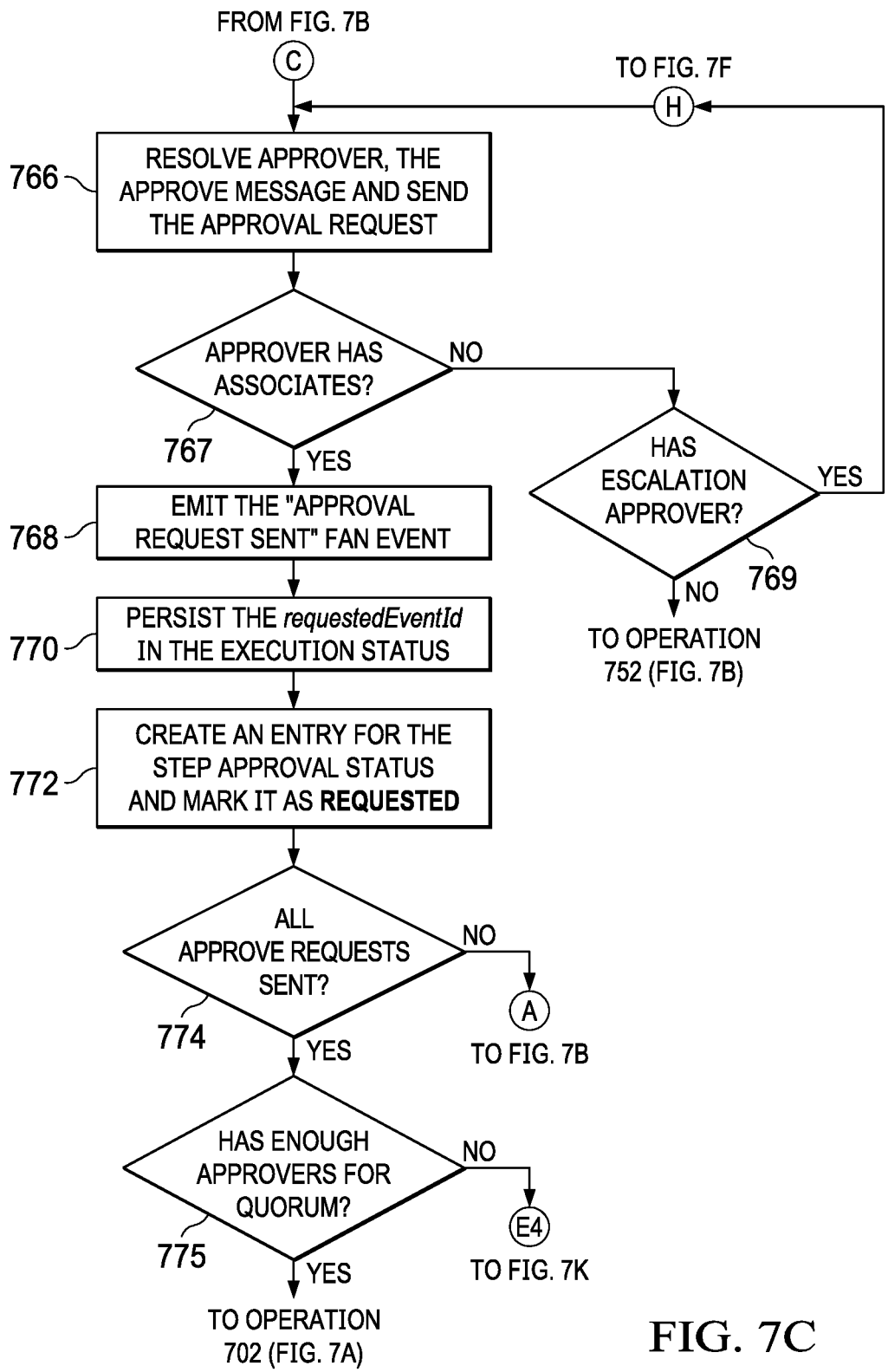
FIG. 7C is part of a single flowchart of an improved computer communication process using flexible approval notification, in accordance with an illustrative embodiment.
Figure 7D:
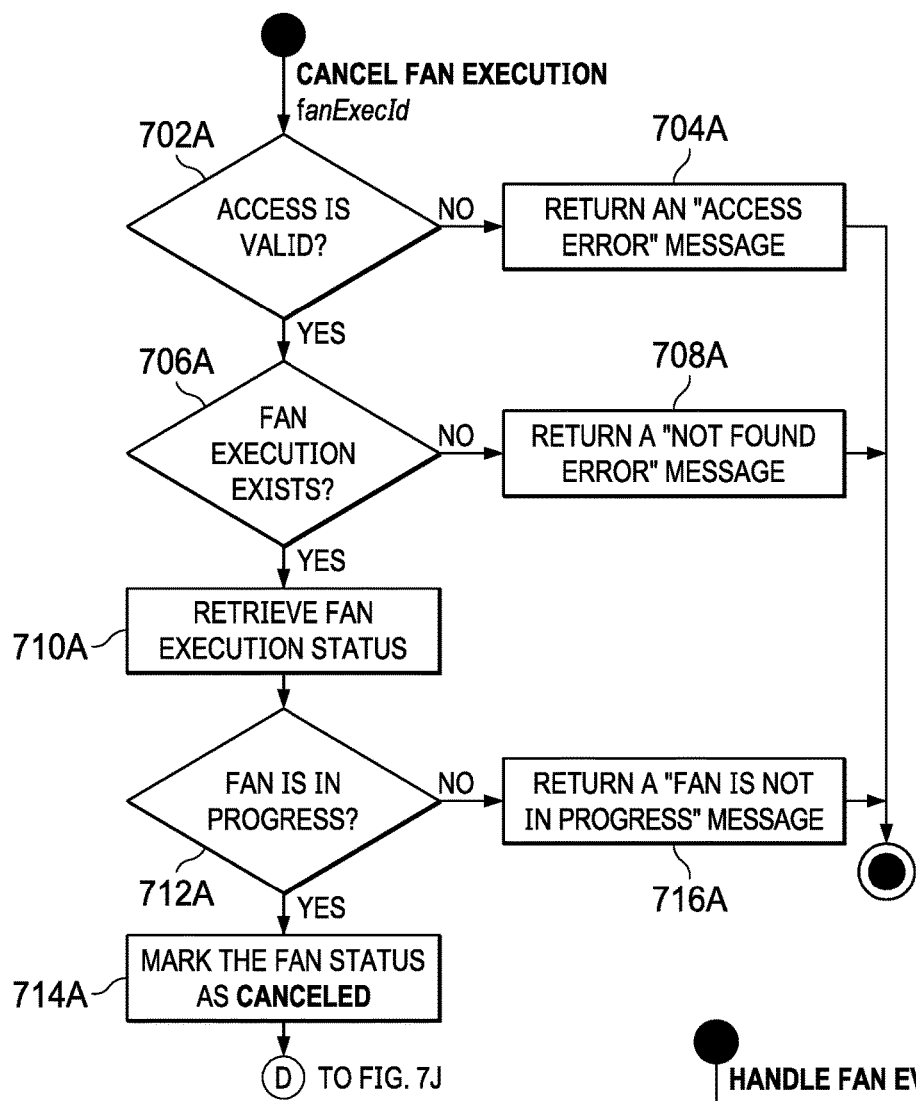
FIG. 7D is part of a single flowchart of an improved computer communication process in an enterprise environment using flexible approval notification, in accordance with an illustrative embodiment.
Figure 7E:
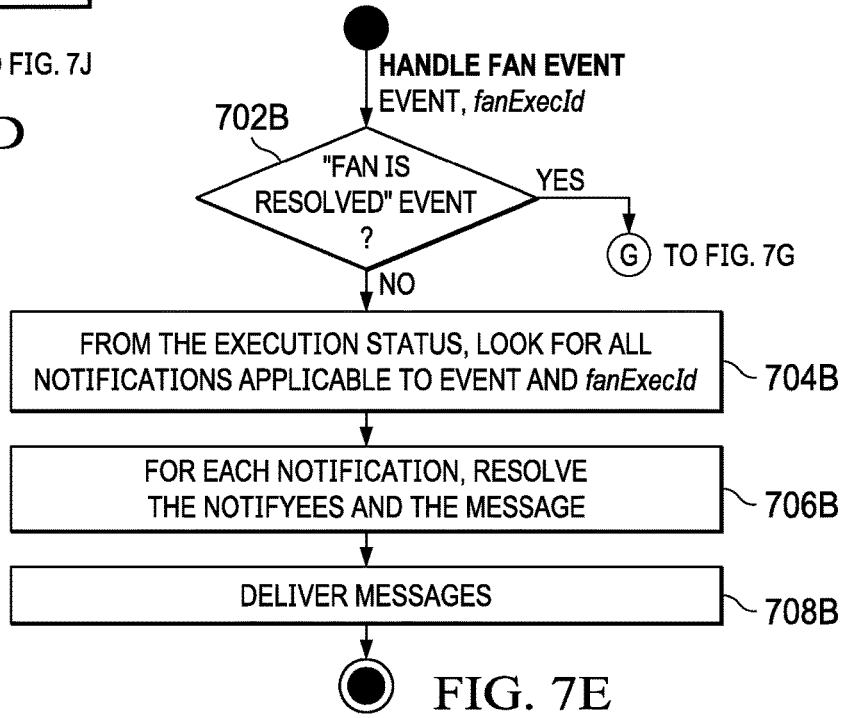
FIG. 7E is part of a single flowchart of an improved computer communication process in an enterprise environment using flexible approval notification, in accordance with an illustrative embodiment.
Figure 7F:
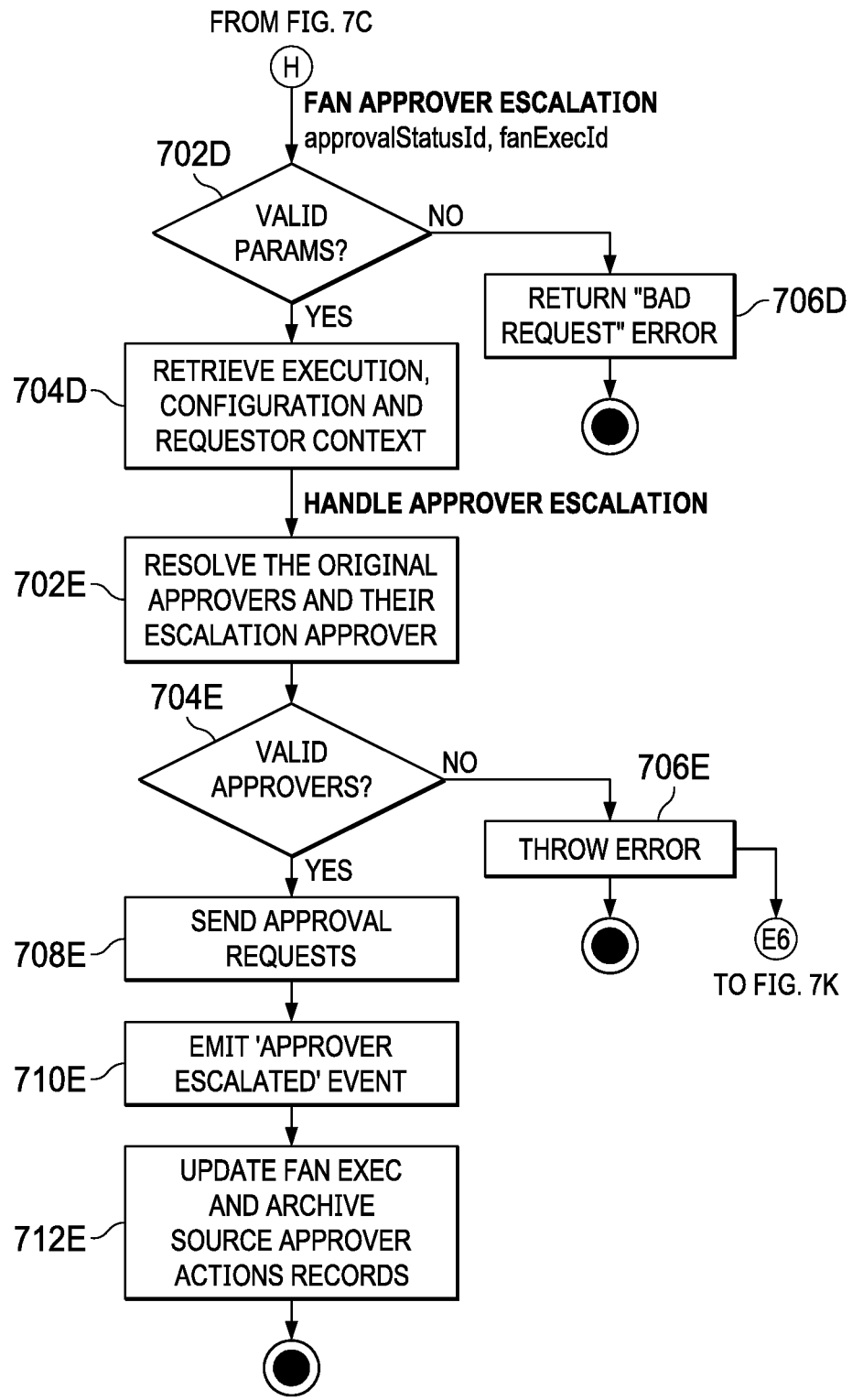
FIG. 7F is part of a single flowchart of an improved computer communication process in an enterprise environment using flexible approval notification, in accordance with an illustrative embodiment.
Figure 7G:
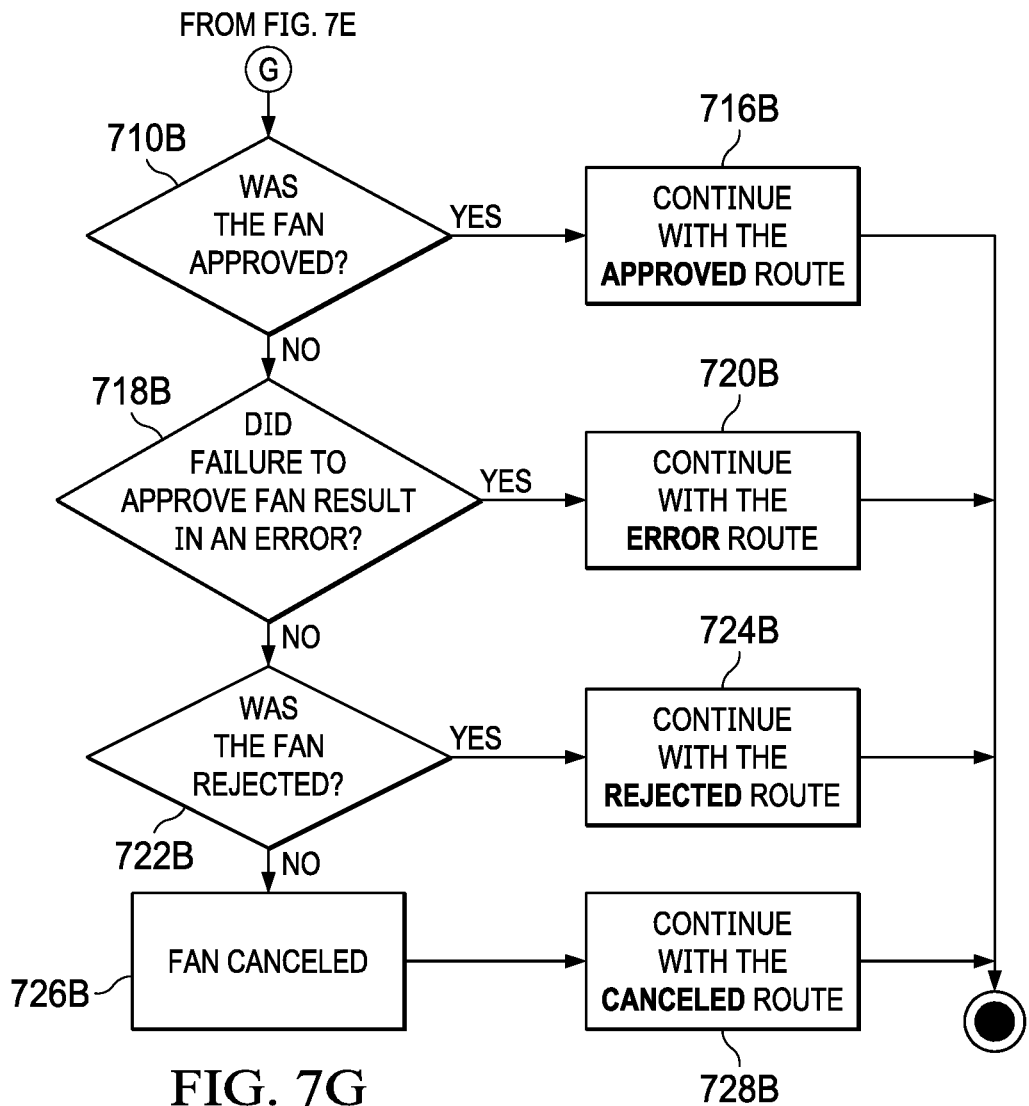
FIG. 7G is part of a single flowchart of an improved computer communication process in an enterprise environment using flexible approval notification, in accordance with an illustrative embodiment.
Figure 7H:
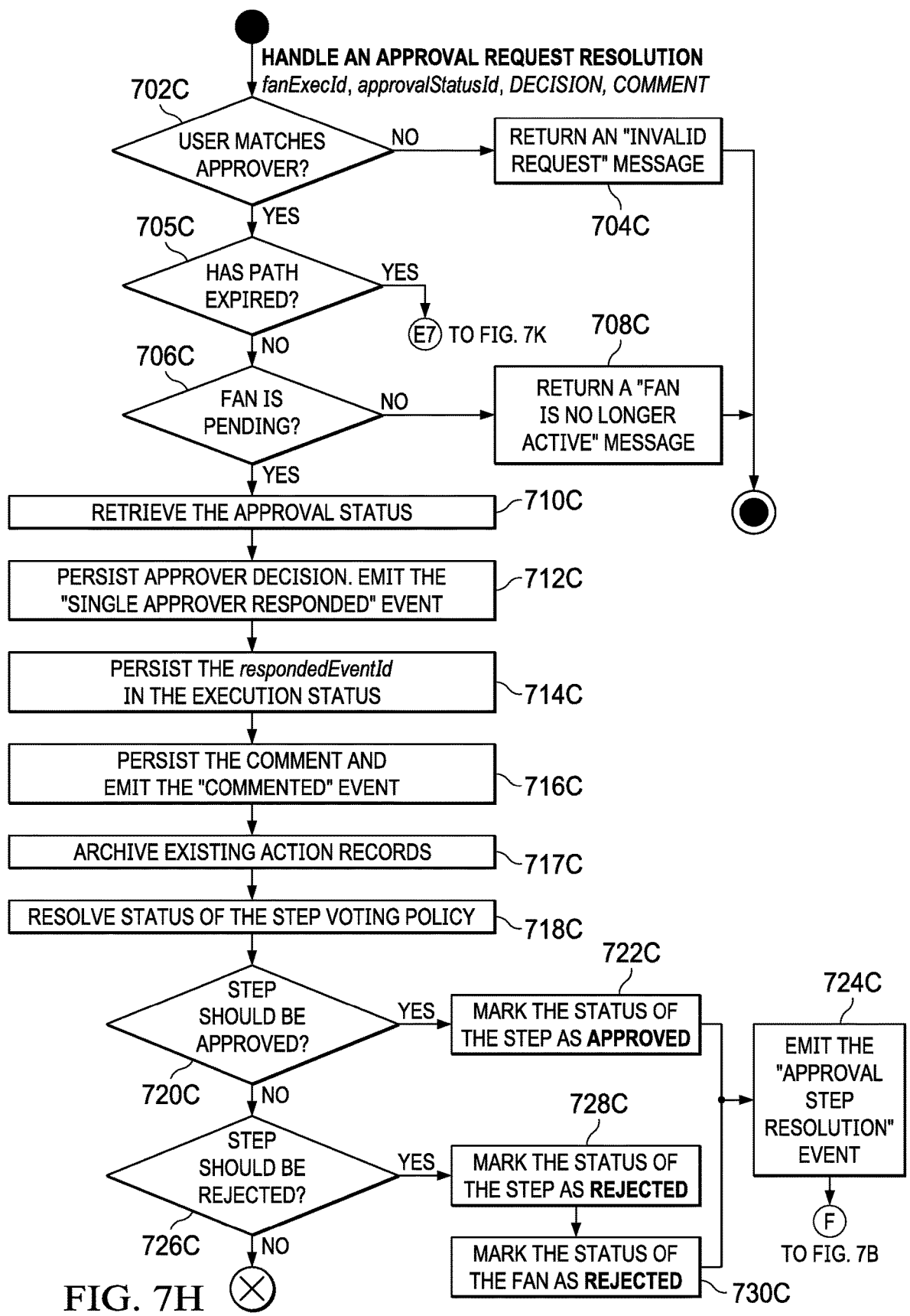
FIG. 7H is part of a single flowchart of an improved computer communication process in an enterprise environment using flexible approval notification, in accordance with an illustrative embodiment.
Figure 7I:
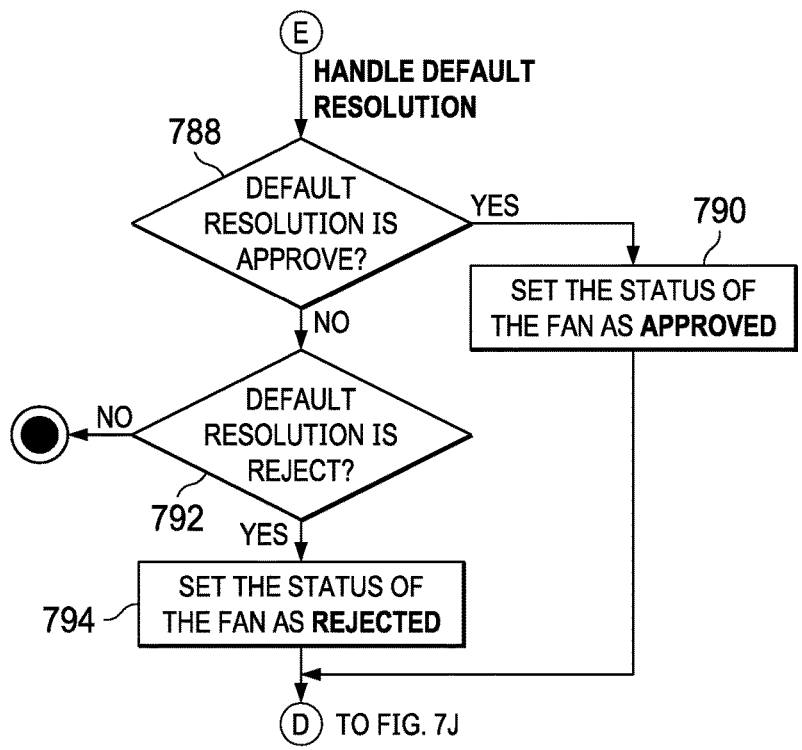
FIG. 7I is part of a single flowchart of an improved computer communication process in an enterprise environment using flexible approval notification, in accordance with an illustrative embodiment.
Figure 7J:
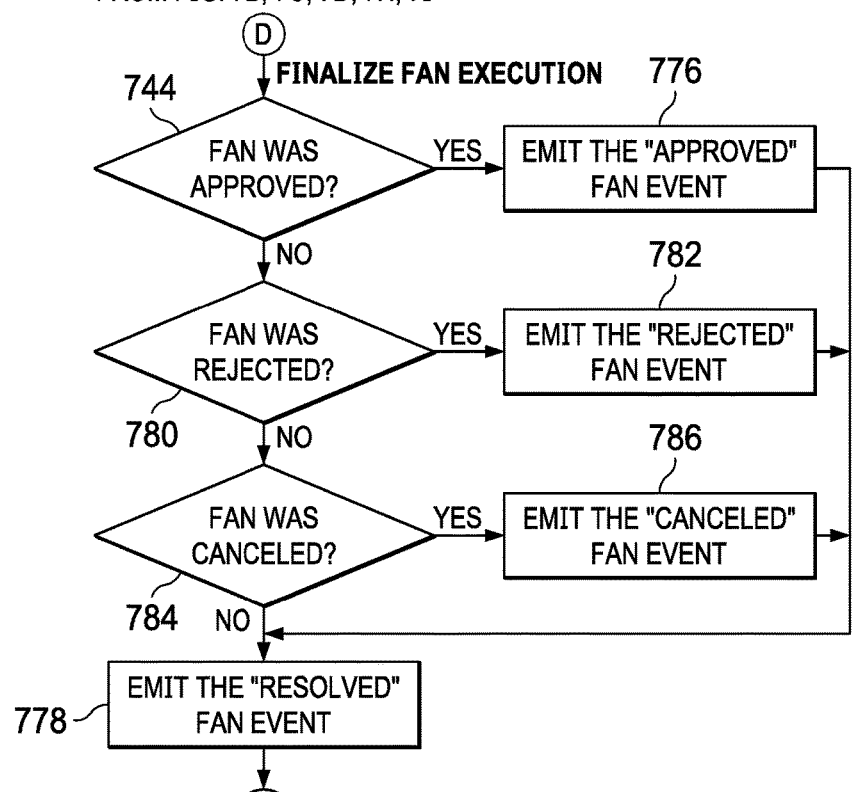
FIG. 7J is part of a single flowchart of an improved computer communication process in an enterprise environment using flexible approval notification, in accordance with an illustrative embodiment.
Figure 7K:
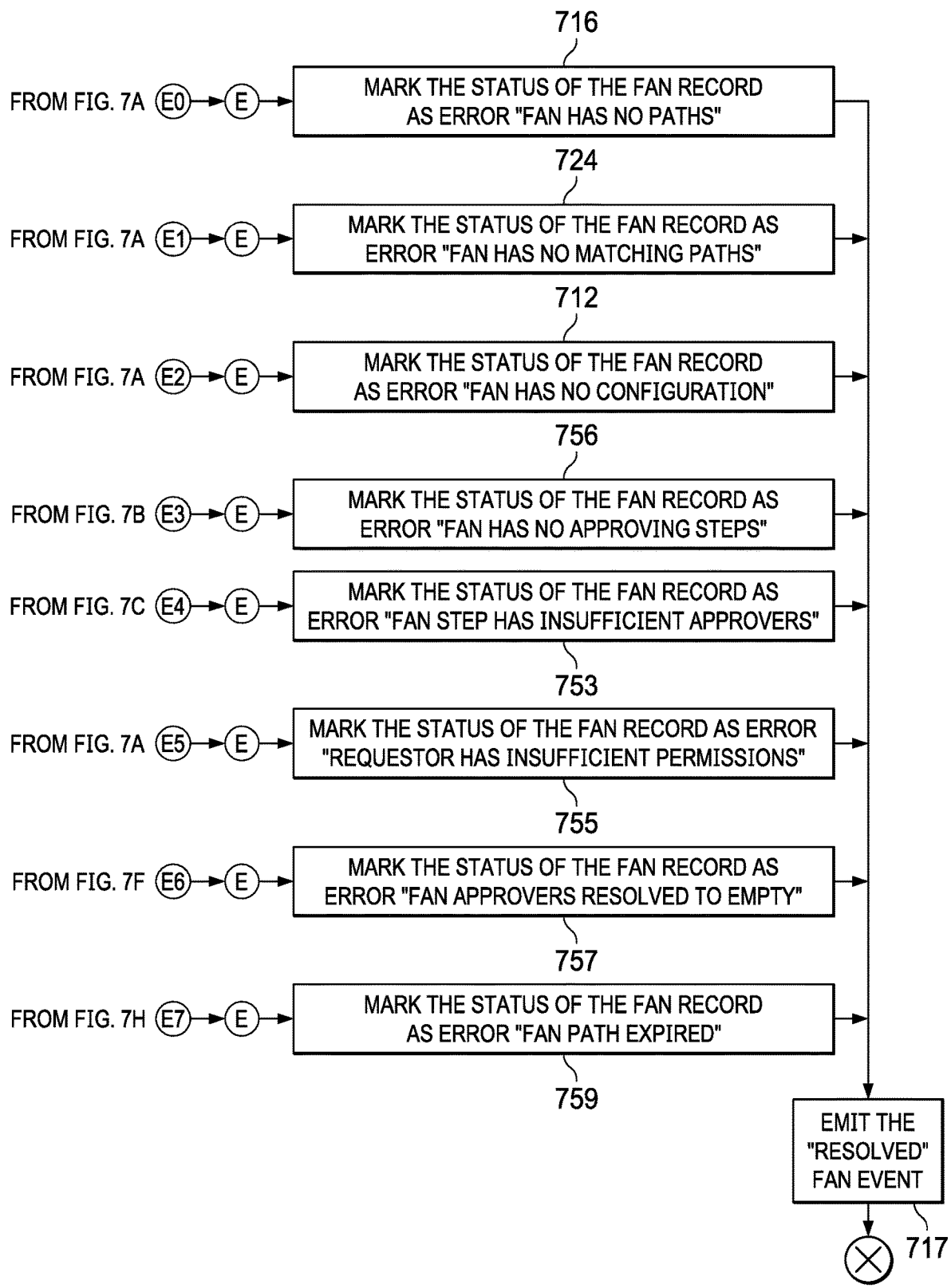
FIG. 7K is part of a single flowchart of an improved computer communication process in an enterprise environment using flexible approval notification, in accordance with an illustrative embodiment.
Figure 8A:
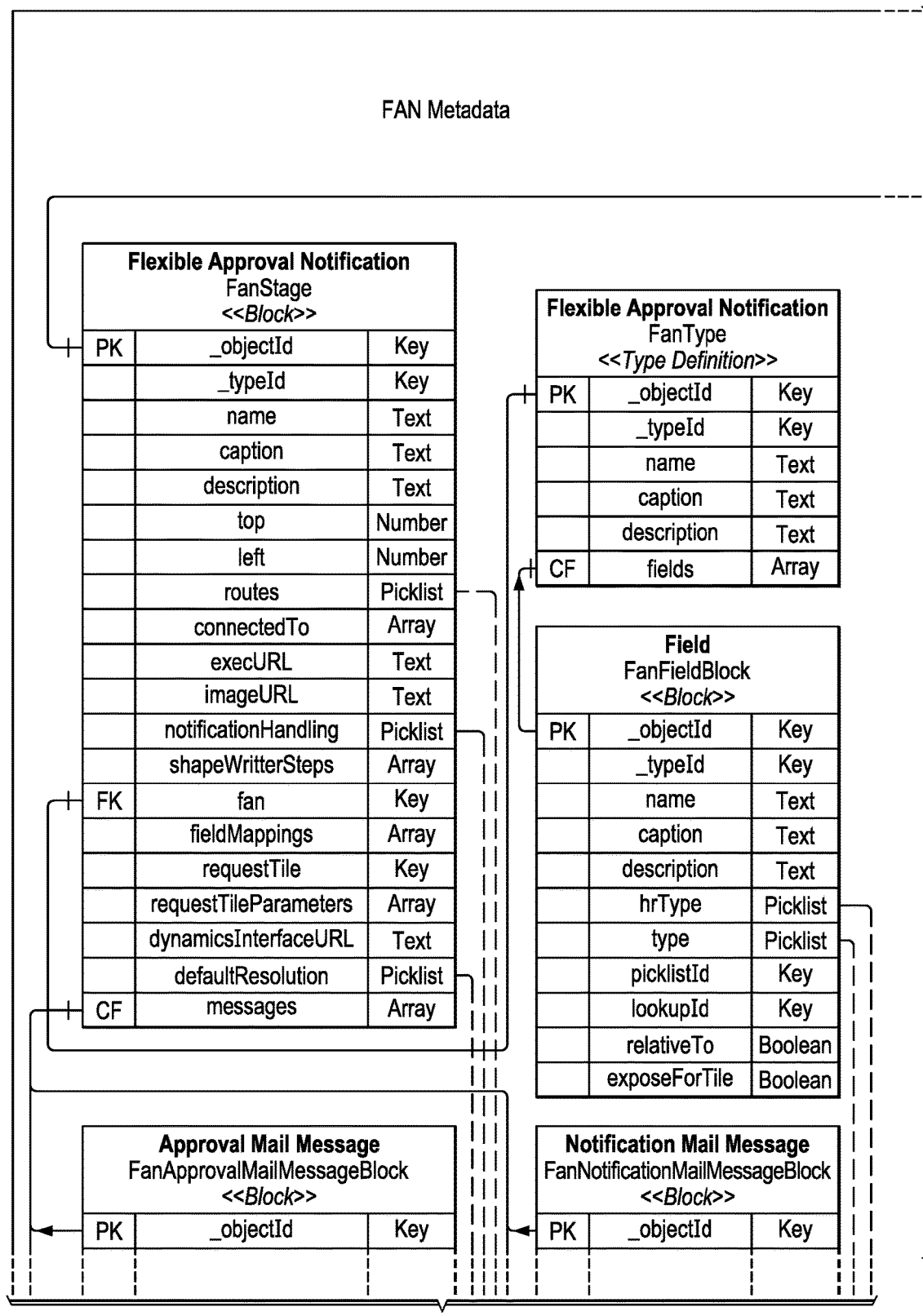
FIG. 8A is part of a single data model that supports an improved computer communication process in an enterprise environment using flexible approval notification, in accordance with an illustrative embodiment.
Figure 8B:
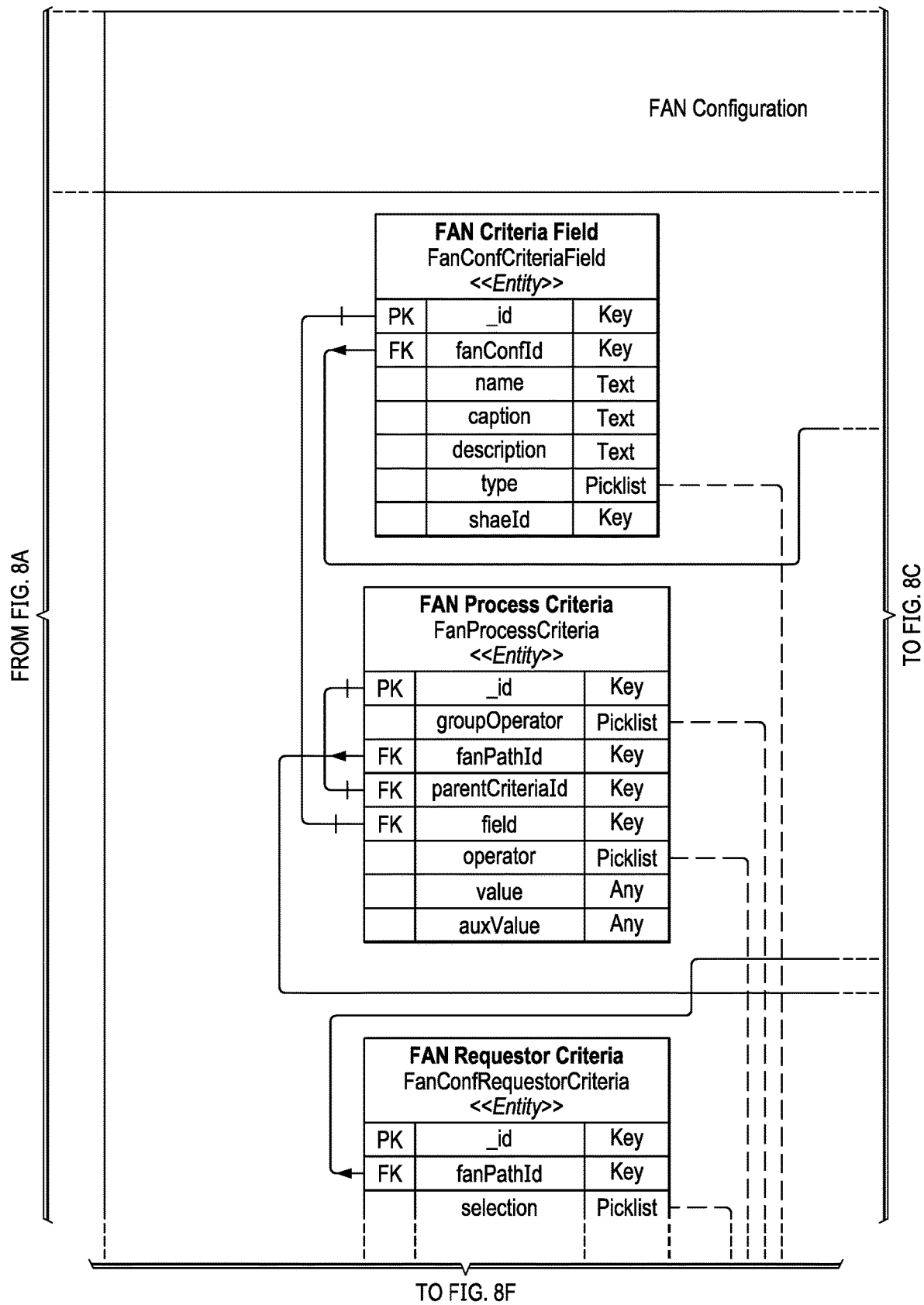
FIG. 8B is part of a single data model that supports an improved computer communication process in an enterprise environment using flexible approval notification, in accordance with an illustrative embodiment.
Figure 8C:
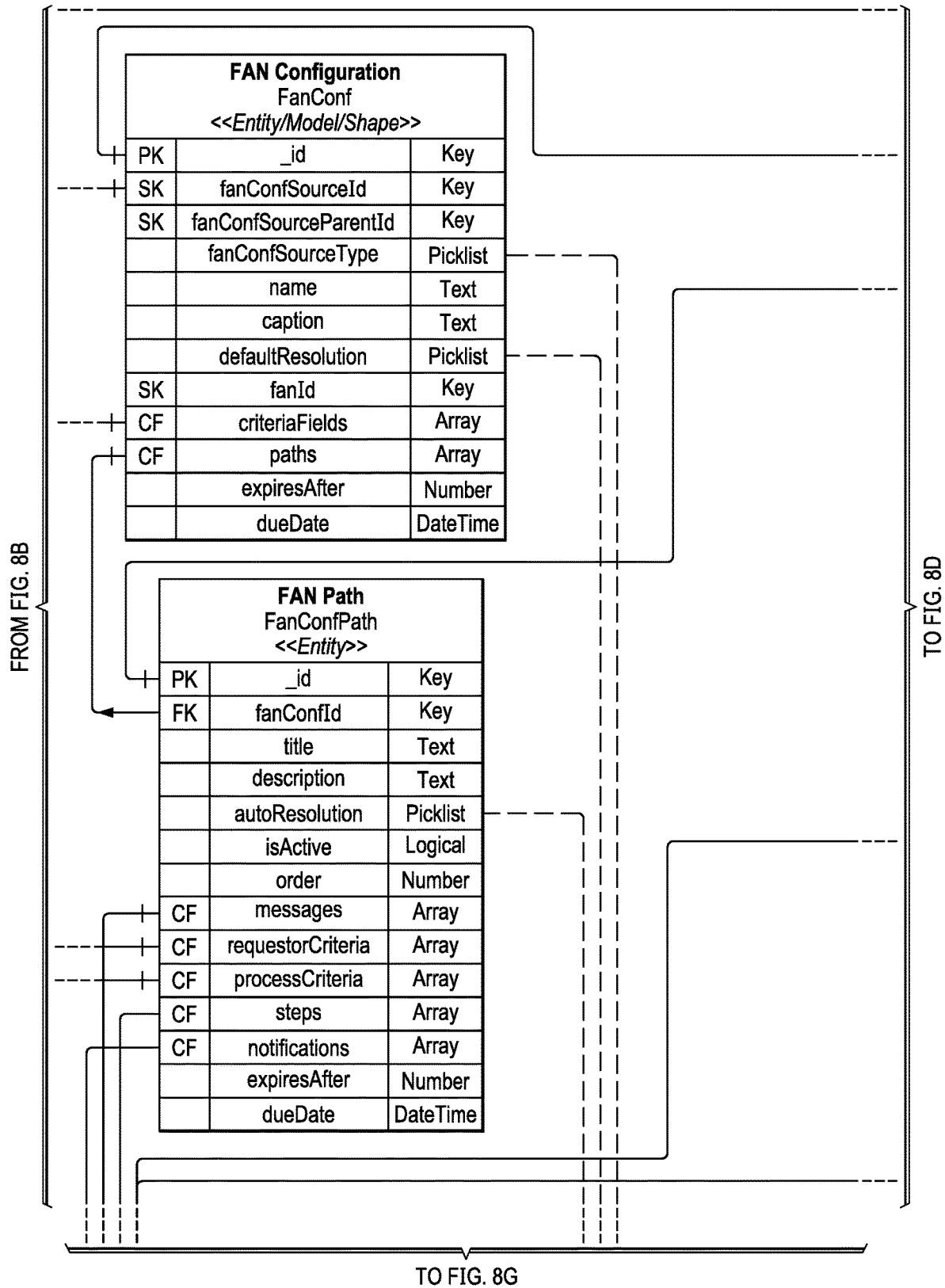
FIG. 8C is part of a single data model that supports an improved computer communication process in an enterprise environment using flexible approval notification, in accordance with an illustrative embodiment.
Figure 8D:
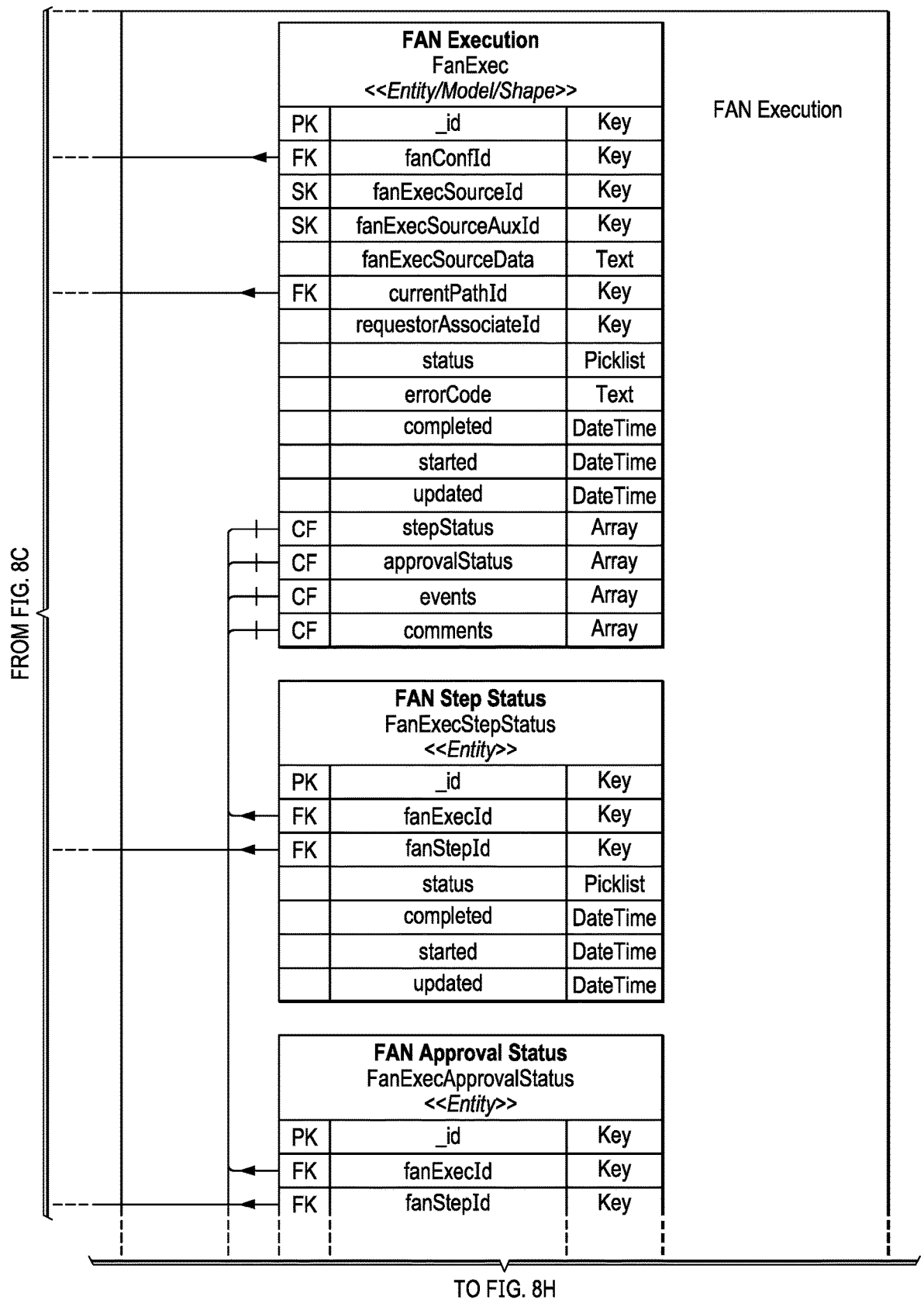
FIG. 8D is part of a single data model that supports an improved computer communication process in an enterprise environment using flexible approval notification, in accordance with an illustrative embodiment.
Figure 8E:
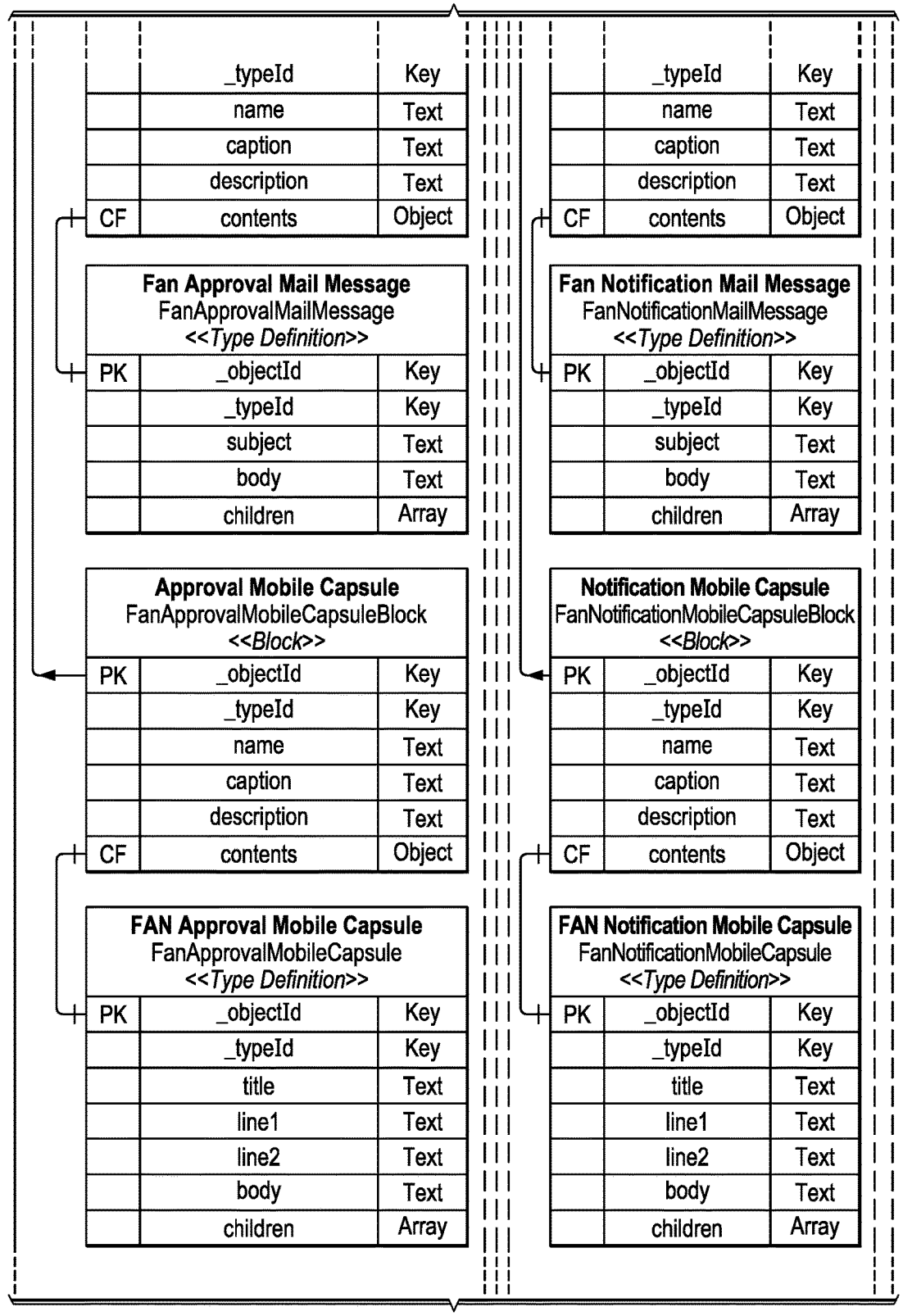
FIG. 8E is part of a single data model that supports an improved computer communication process in an enterprise environment using flexible approval notification, in accordance with an illustrative embodiment.
Figure 8F:
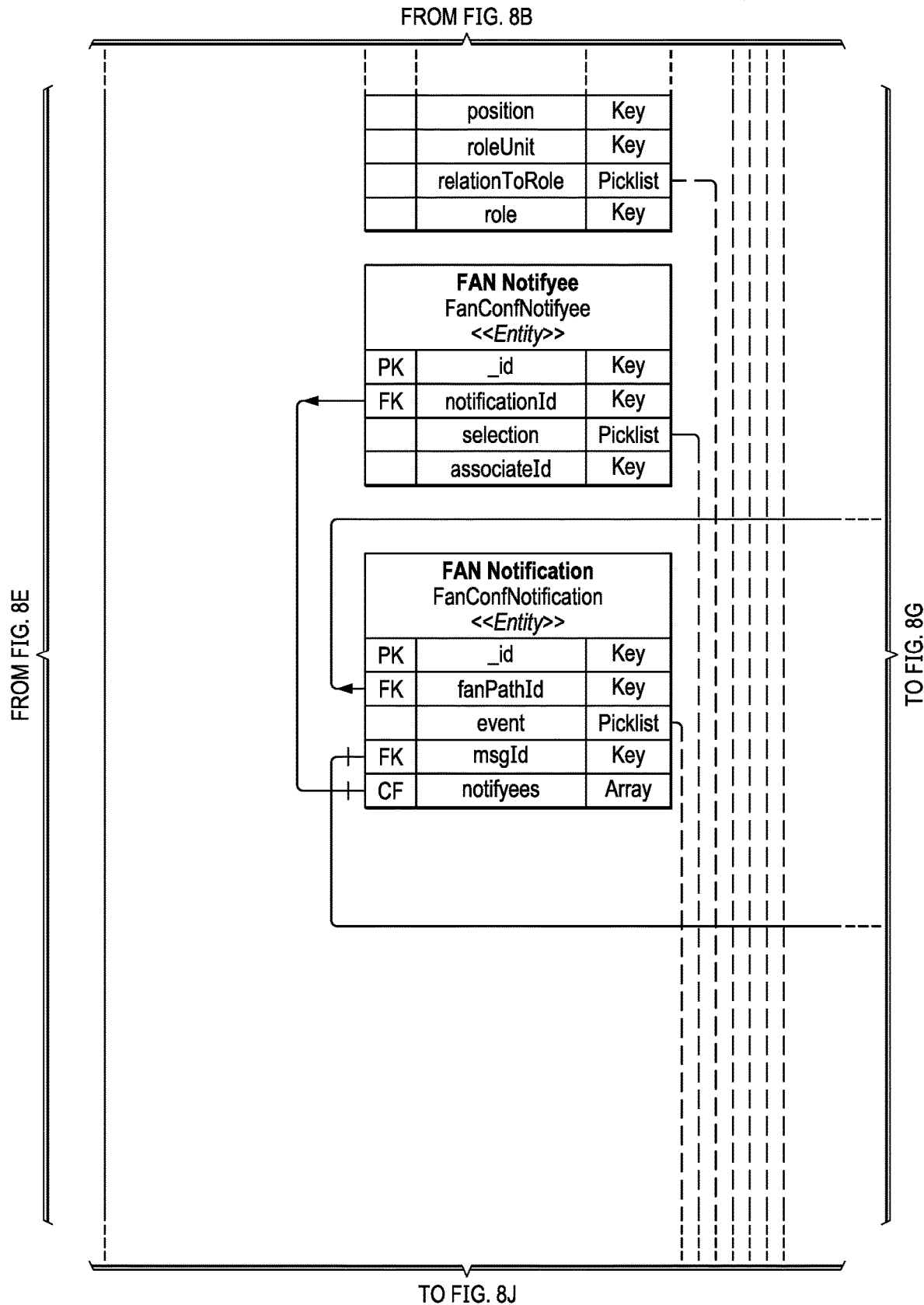
FIG. 8F is part of a single data model that supports an improved computer communication process in an enterprise environment using flexible approval notification, in accordance with an illustrative embodiment.
Figure 8G:
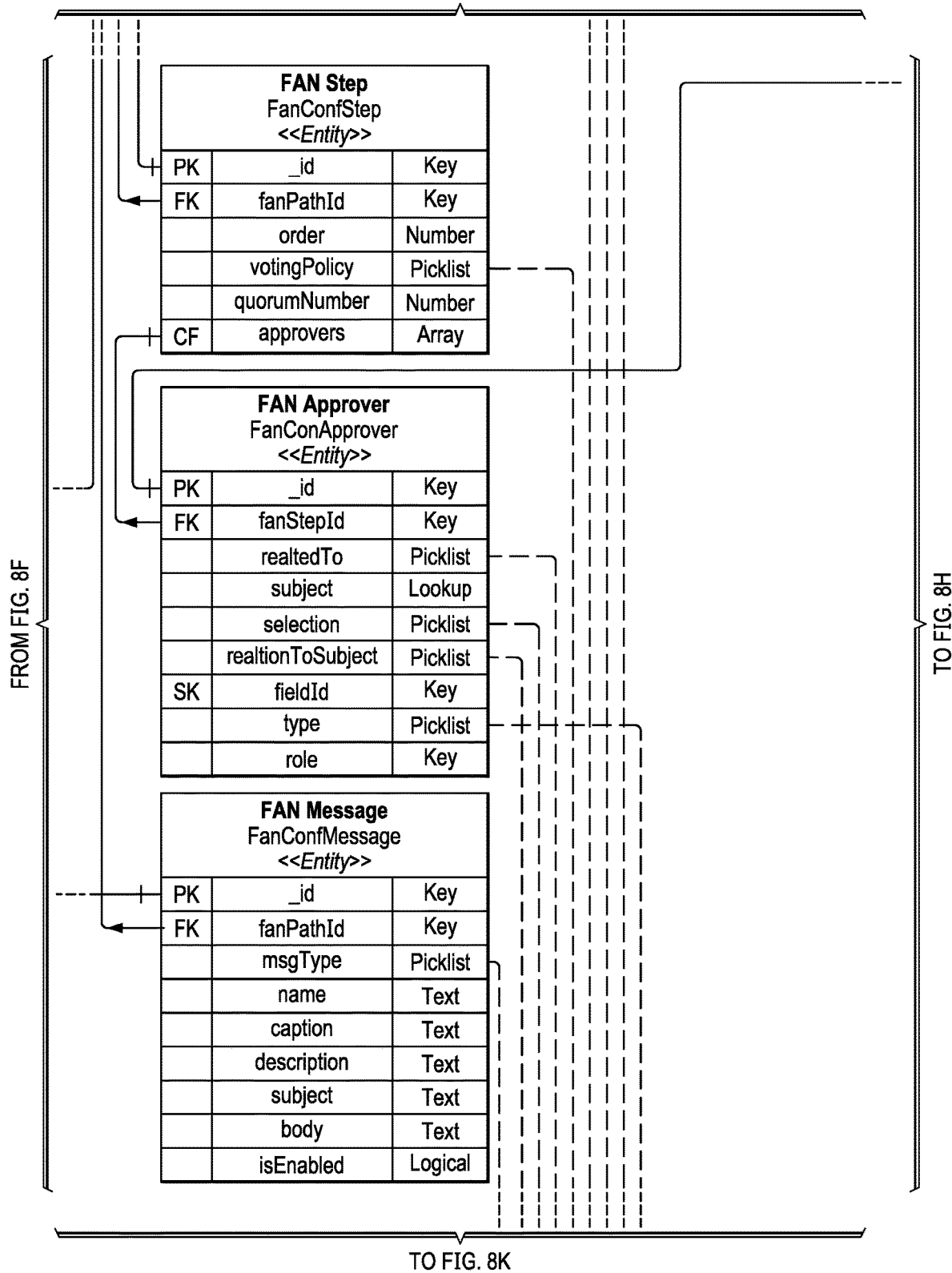
FIG. 8G is part of a single data model that supports an improved computer communication process in an enterprise environment using flexible approval notification, in accordance with an illustrative embodiment.
Figure 8H:
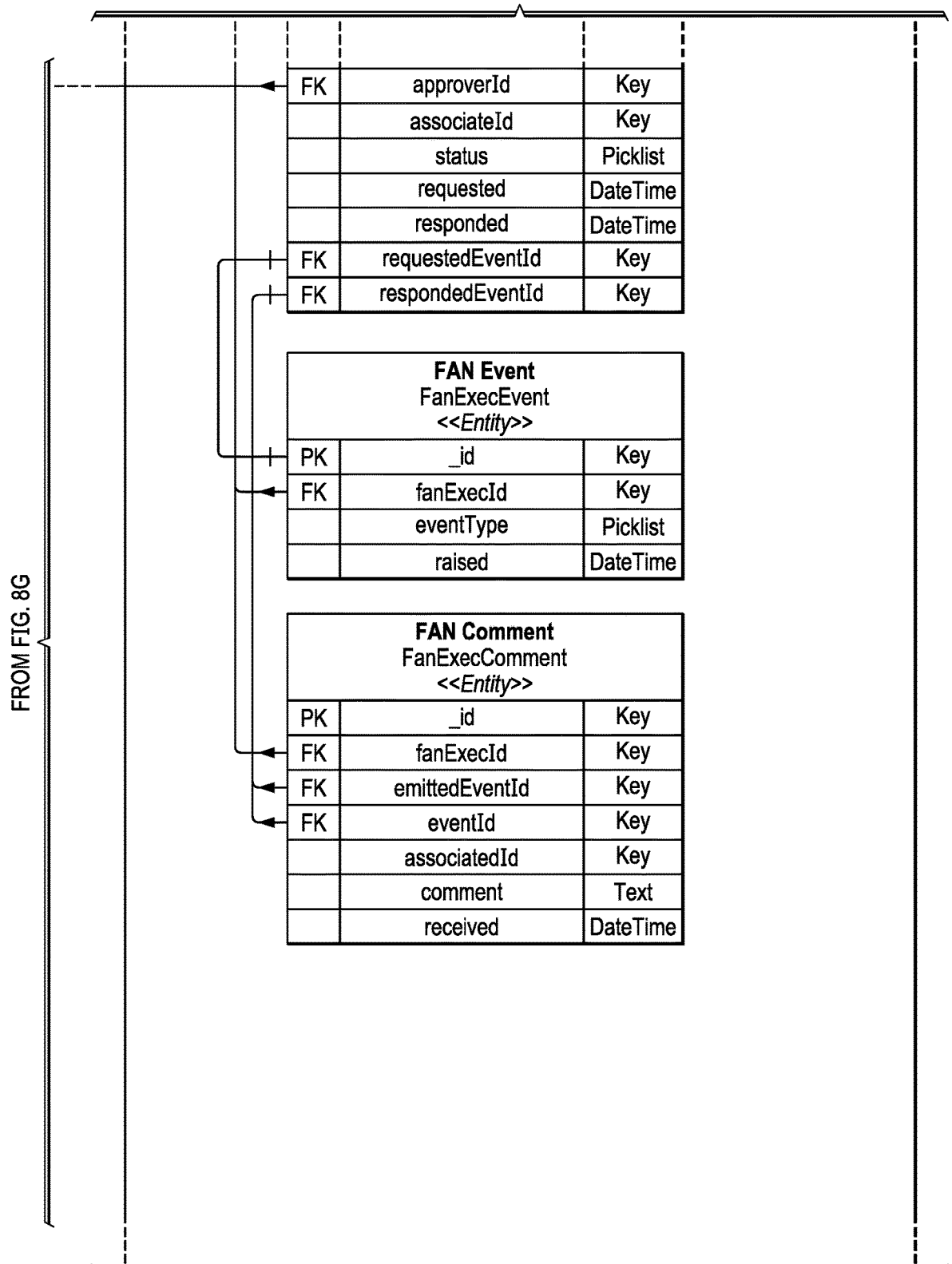
FIG. 8H is part of a single data model that supports an improved computer communication process in an enterprise environment using flexible approval notification, in accordance with an illustrative embodiment.
Figure 8I:
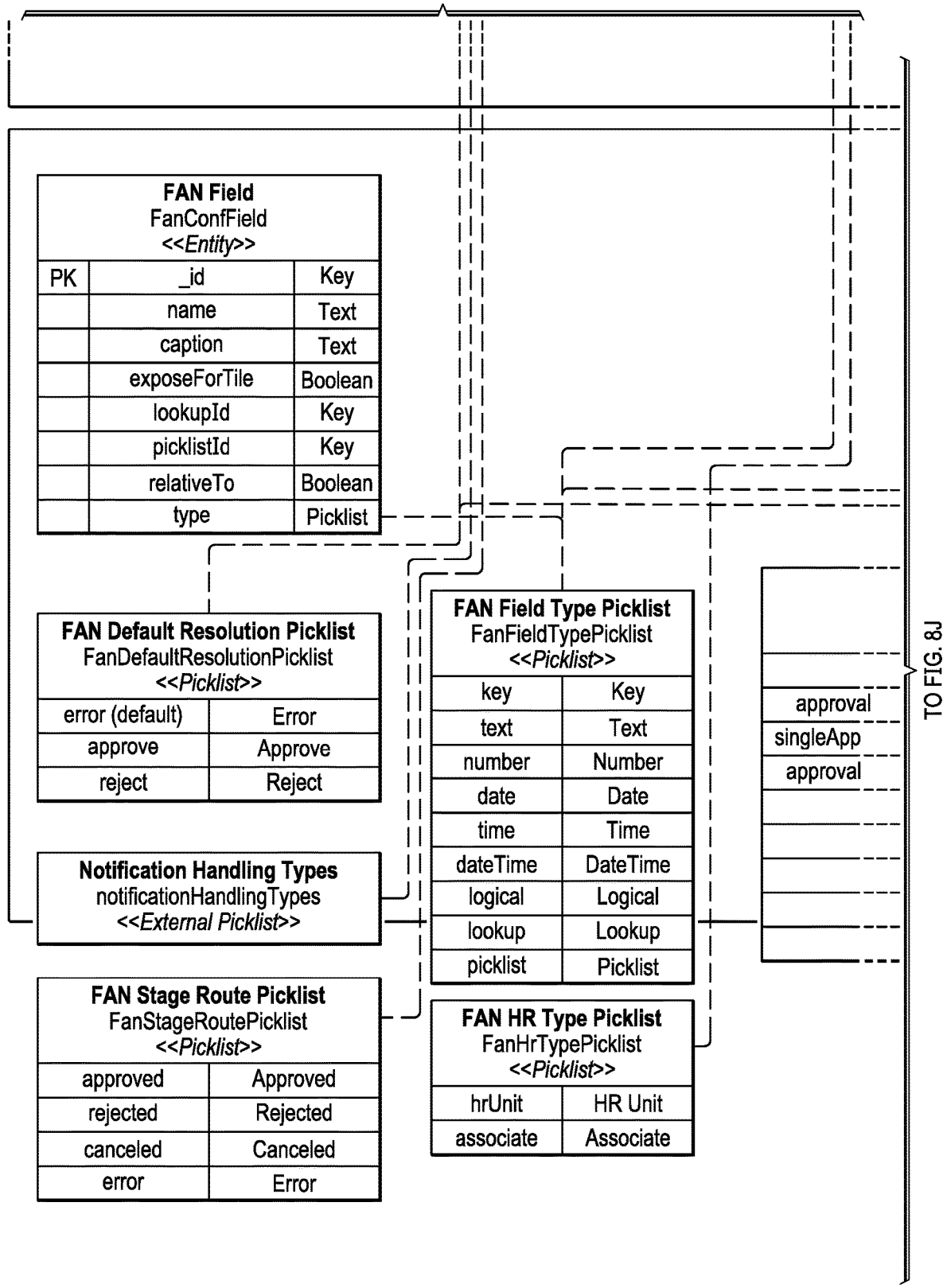
FIG. 8I is part of a single data model that supports an improved computer communication process in an enterprise environment using flexible approval notification, in accordance with an illustrative embodiment.
Figure 8J:
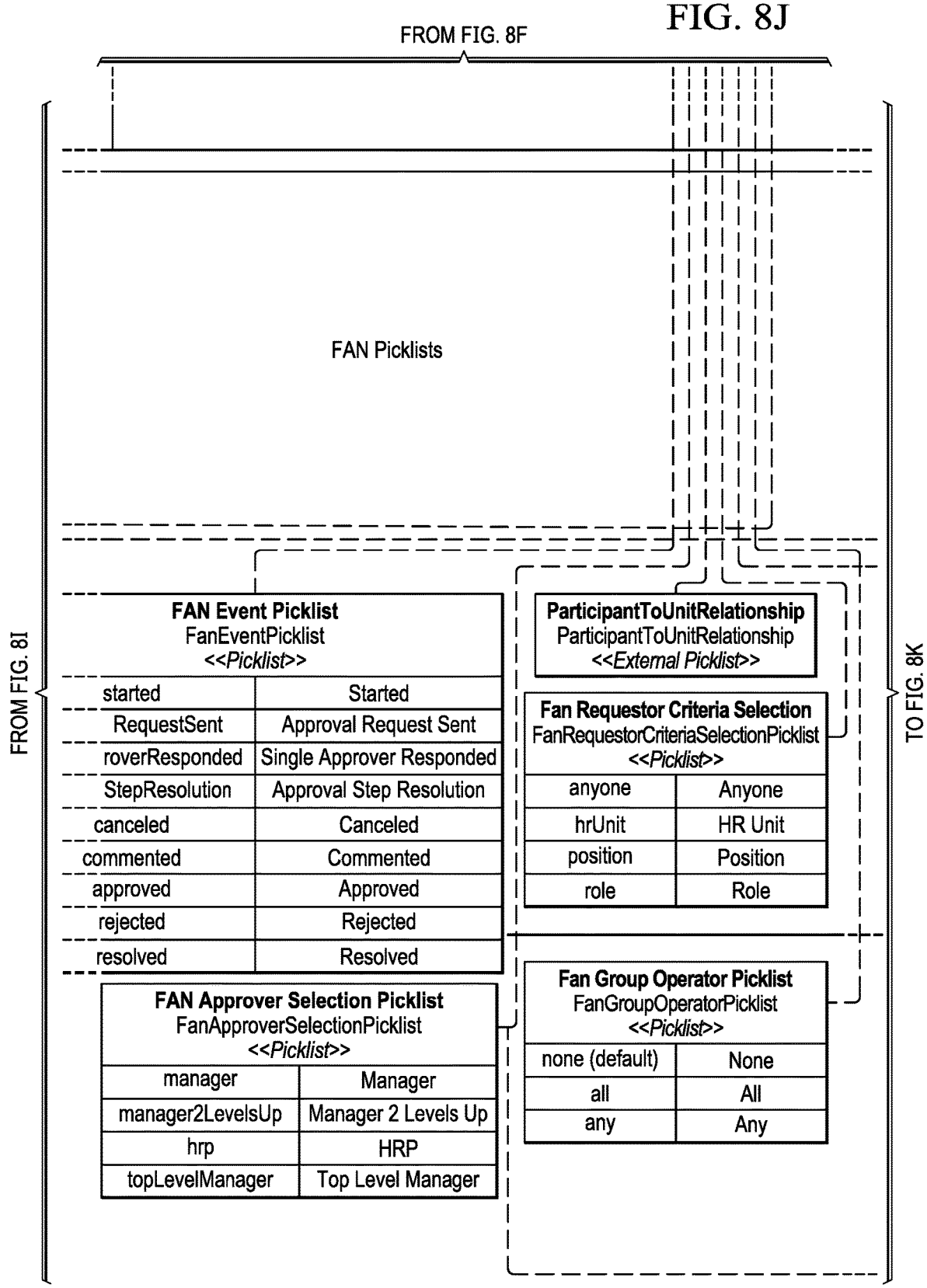
FIG. 8J is part of a single data model that supports an improved computer communication process in an enterprise environment using flexible approval notification, in accordance with an illustrative embodiment.
Figure 8K:
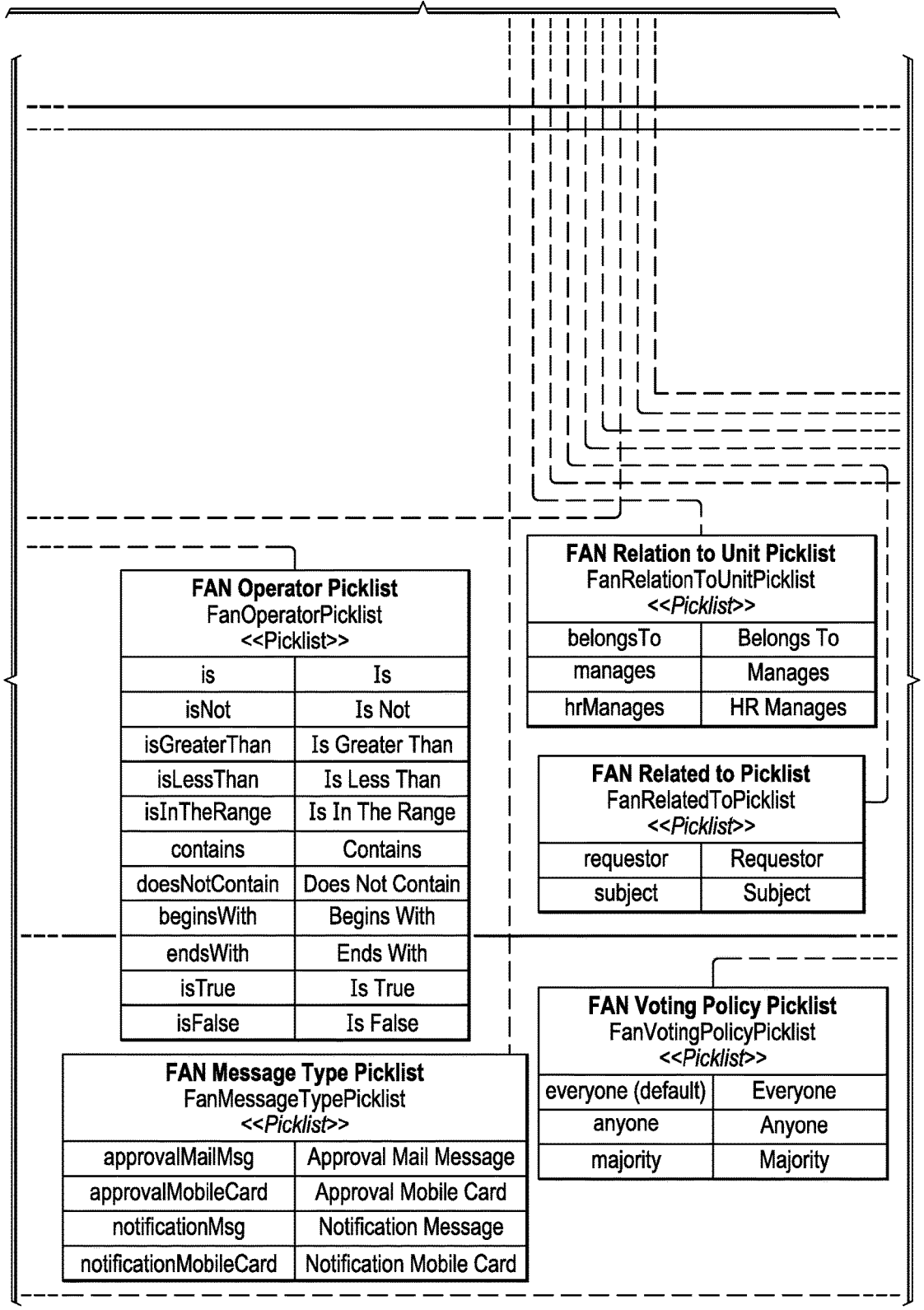
FIG. 8K is part of a single data model that supports an improved computer communication process in an enterprise environment using flexible approval notification, in accordance with an illustrative embodiment.

Attention is now turned to FIG. 7K to the various operations where an error was noted, particularly at operations 712, 716, 724, 753, 755, 756, 757, and 759. Just prior to each of these operations, an additional series of operations could take place, all marked as beginning at the circled "E" in FIG. 7.

From circle "E", the processor determines if a default resolution is approved (operation 788). If yes, then the processor sets the status of the FAN as "APPROVED" (operation 790) and method 700 returns to operation 744. If no, then the processor determines if a default resolution is to reject (operation 792). If so, then the processor sets the status of the FAN as "REJECTED" (operation 794) and method 700 returns to operation 744. If not, then method 700 proceeds to cancel FAN execution, handle the FAN event, or handle an approval request resolution, as appropriate, according to the additional operations detailed below.

If in the prior determinations, such as at operation 786, a cancel FAN execution for the fanExecID take place, then the following additional operations are followed. First, the processor determines if access is valid (operation 702A). If not, then the processor returns an "access error" message (operation 704A) and method 700 may terminate thereafter.

Returning to operation 702A, if the access is valid, then the processor determines whether the FAN execution exists (operation 706A). If not, then the processor returns a "not found" error message (operation 708A) and method 700 may terminate thereafter. If so, then the processor retrieves the FAN execution status (operation 710A). The processor then determines whether the FAN is in progress (operation 712A).

If the FAN is in progress, then the processor marks the FAN status as "CANCELED" (operation 714A) and method 700 returns to operation 744. Otherwise, the processor returns a "FAN is not in progress" message (operation 716A) and the process may terminate thereafter.

Attention is now turned to a sub process for handling a FAN event, beginning at operation 702E. The processor makes a determination whether the FAN event is resolved (operation 702B). If not, then the processor, from the execution status, looks for all notifications applicable to the event and fanExecID (operation 704B). The processor then, for each notification, resolves the notifies and the message (operation 706B). The processor then delivers the message or messages (operation 708B). In one illustrative embodiment, the method may terminate thereafter.

Returning to operation 702B, if the FAN event is resolved, then, as indicated at circle "G" in FIG. 7, the processor makes a determination whether the FAN was approved (operation 710B). If so, then the processor continues with the approved route at operation 716E, as described above. If not, then the processor determines whether there was a FAN error (operation 718B). If the failure to approve the fan did result in an error (a "yes" determination), then the processor continues with the error route (operation 720B), as described above. However, if the failure to approve the FAN did not result in an error, then the processor determines whether the FAN was rejected (operation 722B). If so, then the processor continues with the rejected route (operation 724B), as described above. If not, that is if the FAN was not rejected, then the processor determines that the FAN was canceled (operation 726B). Then the processor continues with the canceled route (operation 728B), as described above.

Attention is now turned to handling an approval request resolution for a fanExecID, approvalStatusID, Decision, or Comment, when called for as described above. First, method 700 includes determining whether a user matches the approver (operation 702C). If not, then the processor returns an "invalid request" message (operation 704C). The processor then continues along the error route, as described above.

Returning to operation 702C, if the user does match the approver, then the processor determines if the path has expired (operation 705C). If so, then method 700 proceeds to circle E7 (operation 759), which is to mark the status of the FAN record as "ERROR, 'FAN path expired'". If not, then the method proceeds to determine whether a FAN is pending (operation 706C), if not, then the processor returns a "FAN is no longer active" message (operation 708C), and the processor continues along the canceled route, as described above.

Returning to operation 706C, if the FAN is pending, then the processor retrieves the approval status (operation 710C). The processor then persists the approver decision and emits a "single approver responded" event (operation 712C) to the enterprise environment. The processor then persists the "respondedEventID" in the execution status (operation 714C). The processor then persists the comment and emits the "commented event" (operation 716C) to the enterprise environment. The processor then archives existing action records (operation 717C). The processor then resolves the status of the step voting policy (operation 718C). The step voting policy specifies how many approvers must respond in order to progress a step. If a step has three different criteria for approvers, the client can choose between saying 'everyone' must approve (people who satisfy the three different criteria must all approve) or they can say that a minimum number of approvers must approve.

The processor then determines whether the step should be approved (operation 720C). If so, then the processor marks the status of the step as approved (operation 722C). The processor then emits the "approval step resolution" event (operation 724C). Method 700 then continues as indicated at circle "F" to operation 746, and/or may continue to loop until all operations are executed.

Returning to operation 720C, if the step should not be approved, then the processor determines whether the step should be rejected (operation 726C). If not, then the process may terminate with an error message as the step is not resolved. Otherwise, the processor marks the status of the step as rejected (operation 728C). The processor then marks the status of the FAN as rejected (operation 730C). Thereafter, method 700 returns to operation 724C and emits the approval step resolution event to the enterprise environment, with method 700 thereafter continuing to operation 746.

The illustrative embodiments described with respect to FIG. 7A through FIG. 7-K may be varied. More or fewer or different operations may be present. Thus, the illustrative embodiments are not necessarily limited by the example given by FIG. 7A through FIG. 7-K.

FIG. 8A through FIG. 8L should be read together as a whole. Each of FIG. 8A through FIG. 8L is part of a single data model that supports an improved computer communication process in an enterprise environment using flexible approval notification, in accordance with an illustrative embodiment.

As stated above, FIG. 8A through FIG. 8L are read as a whole and represent a single data model. These Figures are presented using standard data model notation techniques and should be interpreted accordingly. Data model 800 is may be used to implement a flexible approval network, as described above and below, using a graph database such as describe in FIG. 1 through FIG. 6.

The following terms are used with respect to data model 800. Together, the flow of method 700, data model 800, and these terms can be used to program then FAN system described herein.

The following are shared terms:

The term "objectId" is the primary identifier of an instance of a metadata object. Metadata objects may be the building blocks of the platform supporting the FAN system. Metadata objects may take the form of components such as web pages, text inputs, logiflows, and FANs.

The term "typeId" is the primary identifier of a metadata type. Metadata types are the components which are used to create new instances of metadata objects.

The term "caption" refers to the user friendly name of a metadata object.

The term "description" refers to the description of a metadata object.

The term "type" refers to a picklist that allows the developer to choose the data held in a field. Standard types are, text, number, date, time, datetime, lookup, picklist, logical (a Boolean value), and media. Other types exist.

The term "picklist" refers to a statically defined list of options, created in metadata.

The term "lookup" refers to a dynamic list of options including live data and data retrieved from the system of record.

The following terms are used with respect to the FAN stage:

The term "routes" refer to the different resolution possibilities of a FAN stage, which are connected to subsequent logiflow stages that execute additional actions.

The term "execURL" refers to the URL that initiates a FAN.

The term "fieldMappings" refers to the method for providing values to FAN fields. The values are used to evaluate which approval path should be executed.

The term "tile" refers to a metadata object representing a web page.

The term "requestTile" refers to a property that points to a specific tile that is used to review the details of an approval request.

The term "requestTileParameters" refers to additional values necessary or helpful to render the data in the tile. This term may be applied in a browser as universal resource locator (URL) query parameters.

The term "messages" refers to the messages that will be sent during the FAN process.

The following terms are used with respect to fields:

The term "hrType" refers to a picklist that specifies which flex structure or database query to use to find approvers based on whether or not the field references an associate or a structure.

The term "exposeForTile" refers to a true/false choice of whether a field should show in the request details tile.

The term "relativeTo" refers to a true/false choice that determines whether the field is used to find approvers (true) or as criteria (false).

The following terms refer to process criteria:

The term "groupOperator" refers to a picklist that determines if all, any, or none of the process criteria must apply.

The term "operator" refers to a picklist that determines which operation to use to evaluate a row of process criteria.

The terms "value" and "auxValue" refer to the user supplied values to which process criteria are compared.

Figure 9:
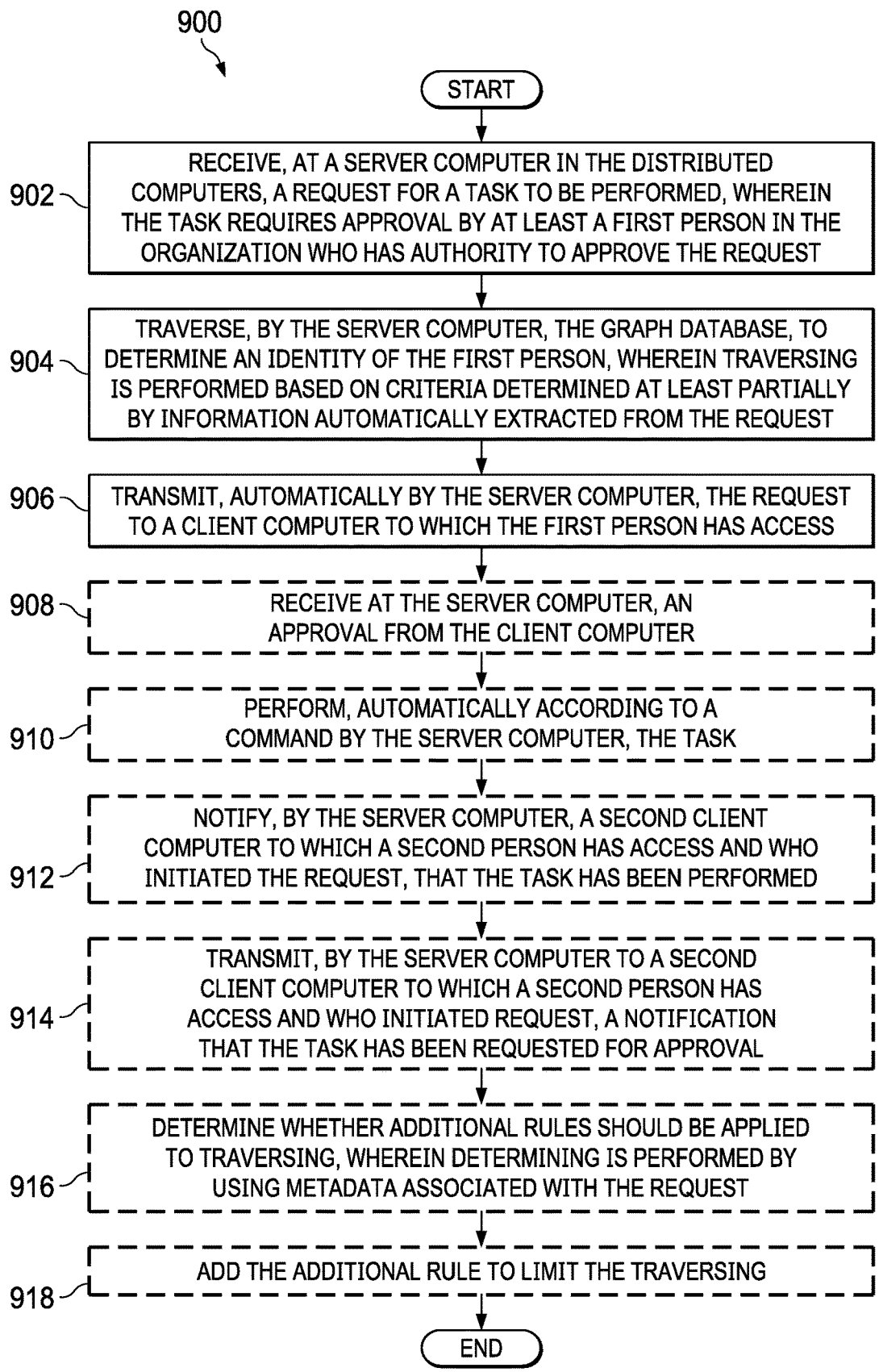
FIG. 9 is a flowchart of a computer-implemented method of enabling distributed computers to communicate more effectively in an enterprise that provides flexible approval notifications in an organization, wherein at least one of the distributed computers stores a graph database in which attributes regarding individuals of the organization are stored, in accordance with an illustrative embodiment.

FIG. 9 is a flowchart of a computer-implemented method of enabling distributed computers to communicate more effectively in an enterprise that provides flexible approval notifications in an organization, wherein at least one of the distributed computers stores a graph database in which attributes regarding individuals of the organization are stored, in accordance with an illustrative embodiment. Method 900 is a variation of the illustrative embodiments described above, such as for example method 700 of FIG. 7A through FIG. 7D. Method 900 may be implemented using one or more data processing systems, such as data processing system 1000 of FIG. 10 using a data model such as data model 800 of FIG. 8A through FIG. 8L. Method 900 is an example and thus does not necessarily limit alternative embodiments described elsewhere herein.

Method 900 may begin by receiving, at a server computer in the distributed computers, a request for a task to be performed, wherein the task requires approval by at least a first person in the organization who has authority to approve the request (operation 902). Method 900 may also include traversing, by the server computer, the graph database, to determine an identity of the first person, wherein traversing is performed based on criteria determined at least partially by information automatically extracted from the request (operation 904). As an alternative, traversing the graph database may be based on client customizable configurations that indicate characteristics about an approver. Method 900 may also include transmitting, automatically by the server computer, the request to a client computer to which the first person has access (operation 906).

Method 900 may include more or fewer operations. For example, in method 900, the first person may be unknown to a client computer to which a second person who initiated the request has access.

Method 900 may have more or fewer operations. Some of the following additional illustrative embodiments are optional, and thus are shown as having a dashed box in FIG. 9. For example, method 900 may also include, after transmitting, receiving at the server computer, an approval from the client computer (operation 908). In this case, method 900 may also include performing, automatically according to a command by the server computer, the task (operation 910). Furthering this example, method 900 may also include not by the server computer, a second client computer to which a second person has access and who initiated the request, that the task has been performed (operation 912).

In a different illustrative embodiment, method 900 may include transmitting, by the server computer to a second client computer to which a second person has access and who initiated request, a notification that the task has been requested for approval (operation 914). In an illustrative embodiment, traversing is also performed based on additional rules supplied by the server computer. In another illustrative embodiment, traversing is also performed based on additional criteria supplied by the server computer.

In yet a different illustrative embodiment an additional person is required for approval. In this case, method 900 also includes traversing further includes identifying the additional person from within the graph database. Accordingly, in this illustrative embodiment, method 900 also includes transmitting, automatically by the server computer, the request to a second client computer to which the additional person has access.

In yet another variation, method 900 traversing also may include determining whether additional rules should be applied to traversing. In this case, determining may be performed by using metadata associated with the request. Additionally, responsive to determining that an additional rule is to be applied to traversing, adding the additional rule to limit the traversing.

In still another variation, method 900 also includes supplying additional criteria to traversing based on metadata associated with the request. In another illustrative embodiment, traversing is further based on relationships among individuals in the organization. In still another illustrative embodiment, access to source data to which the graph database is avoided while traversing.

In a different variation, method 900 also includes transmitting from the server computer a request to access a plurality of different ones of the source data. In this case, method 900 also may include aggregating, by the server computer, the plurality of different ones of the source data.

In a still different variation, method 900 also may include, prior to traversing, configuring a route that traversing will take in the graph database. Thus, the illustrative embodiments are not necessarily limited to the specific examples given above. Still other variations are possible, such as a non-transitory computer readable storage medium storing program code which, when executed by a processor, performs these operations. Likewise, one or more computer, in an enterprise environment, may be programmed to perform these operations. Accordingly, the illustrative embodiments are not necessarily limited by these examples.

Turning now to FIG. 10, an illustration of a data processing system is depicted in accordance with an illustrative embodiment. Data processing system 1000 in FIG. 10 is an example of a data processing system that may be used to implement the illustrative embodiments, such as in FIG. 1 through FIG. 8, or any other module or system or process disclosed herein. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. This software may be an associative memory, content addressable memory, or software for implementing the processes described elsewhere herein. Thus, for example, software loaded into memory 1006 may be software for executing method 900 of FIG. 9. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different, embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method, comprising:
    enabling a group of distributed computers to communicate more effectively in an enterprise that provides approval notifications in an organization, wherein at least one of the group of distributed computers stores an organizational graph database in which attributes regarding individuals of the organization are stored;
    receiving, at a server computer in the group of distributed computers, a request for a task to be performed, wherein the request for the task requires approval by at least a first person in the organization who has authority to approve the request, wherein the first person is identified based on rules, criteria and metadata, wherein there is no inherent definition or role of the first person and determining who can be the first person is calculated only based on inputs of path process and rules configured by the organization;
    traversing, by the server computer, the organizational graph database, to determine an identity of the first person, wherein traversing is performed based on both criteria configured by the organization and determined at least partially by information automatically extracted from the request and rules defined by the organization; and
    transmitting, automatically by the server computer, the request to a client computer to which the first person has access.

2. The method of claim 1, wherein the first person is unknown to a client computer to which a second person who initiated the request has access.

3. The method of claim 1 further comprising:
    after transmitting, receiving at the server computer, an approval from the client computer; and
    performing, automatically according to a command by the server computer, the task.

4. The method of claim 3 further comprising:
    notifying, by the server computer, a second client computer to which a second person has access and who initiated the request, that the task has been performed.

5. The method of claim 1 further comprising:
    transmitting, by the server computer to a second client computer to which a second person has access and who initiated request, a notification that the task has been requested for approval.

6. The method of claim 1, wherein traversing is also performed based on additional rules supplied by the server computer and default resolution.

7. The method of claim 1, wherein traversing is also performed based on additional criteria supplied by the server computer and escalation.

8. The method of claim 1, wherein an additional person is required for approval, wherein traversing further includes identifying the additional person from within the organizational graph database, and wherein the method further comprises:
    transmitting, automatically by the server computer, the request to a second client computer to which the additional person has access.

9. The method of claim 1, wherein traversing includes:
    determining whether additional rules should be applied to traversing, wherein determining is performed by using metadata associated with the request; and
    responsive to determining that an additional rule is to be applied to traversing, adding the additional rule to limit the traversing.

10. The method of claim 9 further comprising:
    supplying additional criteria to traversing based on metadata associated with the request.

11. The method of claim 1, wherein traversing is further based on relationships among individuals in the organization.

12. The method of claim 1, wherein access to source data in a relational database, to which the organizational graph database is synchronized, is avoided while traversing.

13. The method of claim 12 further comprising:
    transmitting from the server computer a request to access a plurality of different ones of the source data.

14. The method of claim 13 further comprising:
    aggregating, by the server computer, the plurality of different ones of the source data.

15. The method of claim 1 further comprising:
    prior to traversing, configuring a route that traversing will take in the organizational graph database.

16. A computer readable storage media, comprising
program code which, when implemented by a processor, performs a computer-implemented method of enabling a group of distributed computers to communicate more effectively in an enterprise that provides approval notifications in an organization, wherein at least one of the group of distributed computers stores an organizational graph database in which attributes regarding individuals of the organization are stored;
program code for receiving, at a server computer in the group of distributed computers, a request for a task to be performed, wherein the request for the task requires approval by at least a first person in the organization who has authority to approve the request, wherein the first person is identified based on rules, criteria and metadata, wherein there is no inherent definition or role of the first person and determining who can be the first person is calculated only based on inputs of path process and rules configured by the organization;
program code for traversing, by the server computer, the organizational graph database, to determine an identity of the first person, wherein traversing is performed based on both criteria configured by the organization and determined at least partially by information automatically extracted from the request and rules defined by the organization; and
program code for transmitting, automatically by the server computer, the request to a client computer to which the first person has access.

17. The computer readable storage media of claim 16, wherein the program code for traversing includes:
program code for determining whether additional rules should be applied to traversing, wherein determining is performed by using metadata associated with the request;
program code for default resolution; and
program code for responsive to determining that an additional rule is to be applied to traversing, adding the additional rule to limit the traversing.

18. The computer readable storage media of claim 17, wherein the program code further comprises:
program code for escalation; and
program code for supplying additional criteria to traversing based on metadata associated with the request.

19. A computer system comprising:
a processor; and
a computer readable storage media connected to the processor and storing program code which, when implemented by the processor, performs computer-implemented method of enabling a group of distributed computers to communicate more effectively in an enterprise that provides approval notifications in an organization, wherein at least one of the group of distributed computers stores an organizational graph database in which attributes regarding individuals of the organization are stored, the program code comprising:
program code for receiving, at a server computer in the group of distributed computers, a request for a task to be performed, wherein the request for the task requires approval by at least a first person in the organization who has authority to approve the request, wherein the first person is identified based on rules, criteria and metadata, wherein there is no inherent definition or role of the first person and determining who can be the first person is calculated only based on inputs of path process and rules configured by the organization;
program code for traversing, by the server computer, the organizational graph database, to determine an identity of the first person, wherein traversing is performed based on both criteria configured by the organization and determined at least partially by information automatically extracted from the request and rules defined by the organization; and
program code for transmitting, automatically by the server computer, the request to a client computer to which the first person has access.

20. The computer system of claim 19, wherein the program code for traversing includes:
program code for determining whether additional rules should be applied to traversing, wherein determining is performed by using metadata associated with the request;
program code for responsive to determining that an additional rule is to be applied to traversing, adding the additional rule to limit the traversing;
program code for at least one of default resolution and escalation; and program code for supplying additional criteria to traversing based on metadata associated with the request.

* * * * *